(12) United States Patent
Moore et al.

(10) Patent No.: US 6,729,959 B1
(45) Date of Patent: May 4, 2004

(54) COMPUTER GAME DISPLAY SYSTEM AND PROCESSES, IN ELECTRONICALLY-CONTROLLED MULTI-PARTICIPANT GAME CONTESTS, FOR AGGREGATING AND COMPOSING A COMMON DISPLAY AND FOR INCORPORATING VIRTUAL PARTICIPANTS IN THE CONTEXT OF GAMES/CONTESTS INVOLVING ACTIVE PARTICIPANTS

(75) Inventors: Rodney K. Moore, Canoga Park, CA (US); Allen R. Hecht, Granada Hills, CA (US); Thomas P. Riley, Van Nuys, CA (US)

(73) Assignee: Winnovations, LLC, Van Nuys, CA (US)

( * ) Notice: Subject to any disclaimer, the term of this patent is extended or adjusted under 35 U.S.C. 154(b) by 313 days.

(21) Appl. No.: 09/586,938

(22) Filed: Jun. 2, 2000

Related U.S. Application Data

(60) Provisional application No. 60/137,786, filed on Jun. 2, 1999.

(51) Int. Cl.$^7$ .................................................. A63F 9/24
(52) U.S. Cl. ........................................... 463/30; 463/42
(58) Field of Search ................................ 463/1–19, 25, 463/30–31, 35, 37, 39–40, 42; 273/461

(56) References Cited

U.S. PATENT DOCUMENTS

| | | | |
|---|---|---|---|
| 4,760,527 A | * | 7/1988 | Sidley .......................... 463/13 |
| 4,926,327 A | | 5/1990 | Sidley |
| 5,242,163 A | | 9/1993 | Fulton |
| 5,351,970 A | | 10/1994 | Fioretti |
| 5,393,057 A | | 2/1995 | Marnell, II |
| 5,494,294 A | | 2/1996 | Cappetta |
| 5,564,701 A | | 10/1996 | Dettor |
| 5,569,083 A | | 10/1996 | Fioretti |
| 5,601,287 A | | 2/1997 | Lundin |
| 5,683,295 A | | 11/1997 | Frain |
| 5,687,971 A | | 11/1997 | Khaladkar |
| 5,700,009 A | | 12/1997 | Meoni |
| 5,762,552 A | * | 6/1998 | Vuong et al. ................. 463/25 |
| 5,782,470 A | | 7/1998 | Langan |
| 5,830,067 A | | 11/1998 | Graves et al. |
| 5,951,396 A | | 9/1999 | Tawil |
| 5,984,779 A | | 11/1999 | Bridgeman et al. |
| 6,007,427 A | * | 12/1999 | Wiener et al. ................. 463/17 |
| 6,056,640 A | * | 5/2000 | Schaaij .......................... 463/4 |
| 6,088,004 A | * | 7/2000 | Domae et al. ................ 345/1.1 |
| 6,149,519 A | * | 11/2000 | Osaki et al. .................... 463/1 |
| 6,273,820 B1 | * | 8/2001 | Haste, III ..................... 463/40 |

\* cited by examiner

*Primary Examiner*—Kim Nguyen
(74) *Attorney, Agent, or Firm*—Kelly Bauersfeld Lowry & Kelley, LLP

(57) ABSTRACT

An information display system and method is provided for computer-based games and the like, particularly of the type involving multiple participants who may be present at a game site or alternately located at one or more remote sites. The display system and method monitors the status of each participant as a particular game progresses. The system combines the monitored status information for all participants and generates a common information display so that individual participants can view their status relative to other game participants, and thereby assess their individual chances of winning as the game proceeds. The invention is suited for rapid and efficient playing of games of chance or skill in a casino environment or the like, wherein the game can accommodate a large number of participants including "active" participants located at the game site as well as "virtual" participants who may not be present at the game site.

60 Claims, 18 Drawing Sheets

Auto-Play Speed Bingo

FIG. 1

Auto-Play Speed Bingo

Auto-Play Speed Bingo

Auto-Play Speed Bingo

Account status includes:
  Number of games played
  Credits won
  Current credit balance
  Status of 'quit' options.

COMPUTER GAME DISPLAY SYSTEM AND PROCESSES, IN ELECTRONICALLY-CONTROLLED MULTI-PARTICIPANT GAME CONTESTS, FOR AGGREGATING AND COMPOSING A COMMON DISPLAY AND FOR INCORPORATING VIRTUAL PARTICIPANTS IN THE CONTEXT OF GAMES/CONTESTS INVOLVING ACTIVE PARTICIPANTS

This application claims the benefit of copending Provisional Application No. 60/137,786, filed Jun. 2, 1999.

BACKGROUND OF THE INVENTION

This invention relates generally to computer-based or electronically controlled games of skill and/or chance involving multiple participants. More specifically, this invention relates to a game display system and method for generating a common information display indicating the progress or status of all game participants, so that individual participants can view their own status relative to all game participants and thereby assess or estimate their odds of winning.

In recent years, there has been a proliferation of computer-based, electronically controlled games. Such games have included a wide variety of games of chance used in the gaming (gambling) industry, as well as a wide variety of entertainment-type games that do not involve aspects of gambling. Early computer-based games were designed to support a single participant. More recently, enhanced computer performance has enabled the development of more sophisticated games which accommodate concurrent access by multiple participants.

Examples of single participant games in the gaming industry include blackjack, poker, keno, and rudimentary forms of bingo. In each case, the single participant is matched against the computer which represents the "house", i.e., the casino or its equivalent. Any decisions made by or actions taken by the single participant prior to or during the course of the game, as well as the outcome, would be entirely independent of any other participant who might be simultaneously playing the same game on another machine. In this regard, while single participant games have provided for simultaneous play of the same game or same type of game by multiple persons, with the multiple games being controlled by a common computer, the participants participate in individual and independent games wherein each matches his or her independent skills against the "house" and not against each other. Such single participant games have included games of chance, games of skill, or a combination thereof.

Examples of multiple participant games in the gaming industry having primarily included various forms of bingo, but also include lottery games of the type conducted in many states wherein winning numbers are randomly selected from a larger field of numbers. In such multiple participant games, each participant participates in competition with all other participants in an effort to win one or more prizes. The results of the game, and the individual participant's chances of winning, can be directly affected by the total number of participants and also by the collective or individual decisions made by other participants.

The most common example of a current computer-based multiple participant bingo game involves a networked system of participant terminals, each with its own monitor or display device, controlled by a master computer which conducts the game and determines the outcome. For each game, a participant is typically able to select one or more cards to be played, to change any one of the selected cards, and perhaps also to view the cards in different ways during the course of the game. The individual participant terminal presents only basic game information such as the game number, the bingo pattern to be achieved for winning, and the numbers which have been called. As the game proceeds, the participant terminal displays the card or cards allocated to that participant and automatically marks each card as the numbers are called to visually indicate the participant's game status or progress. The game concludes when at least one card allocated to at least one participant achieves the winning bingo pattern based on the numbers called.

However, significant information that would be helpful or desirable is not made available to the individual participants. More specifically, the participant terminal does not display any information regarding the real-time status or progress of the participant in relation to other participants, either prior to or during the conduct of the game. Moreover, the participant terminal does not identify the winning card or cards, or the associated winning participant or participants. Relevant pre-game status information could include information regarding the specific cards in play, the number of cards in play for any one participant or for each participant, and/or the total number of cards in play. Status information during the game could include information regarding the progress of each card in play toward achieving the winning bingo pattern.

The provision of such status information regarding the field of multiple participants in real-time to each participant would result in several important benefits. For example, the integrity of the game would be enhanced by disclosing in full to all participants the pre-game, game-in-progress, winning card, and winning participant information. Moreover, each participant would have an opportunity to assess or estimate his or her statistical chances of winning, wherein this factor would further enhance the integrity of game while additionally affording each participant an opportunity to make important decisions such as the number of cards to play and/or whether to continue participation in the game. These factors would contribute to the overall satisfaction and excitement experienced by each participant.

Accordingly, one important objective of the present invention is to provide a game system and method for aggregating relevant information for multiple participants in a computer-based game, particularly such as the progress status of each individual participant as a game proceeds, and compiling and displaying such information in a common information display or format available for viewing in real-time by each game participant.

A further objective of the present invention is to provide a game system and method for accommodating participation by "active" and "virtual" participants in the same game. In this regard, an "active" participant is actively involved in the game, and interacts with the game system in real-time such as by pre-game selection of game elements (e.g., bingo cards) and wagers, and by inputting data as may be required in the course of the game. In a typical computer-based casino game, an "active" participant typically interacts in real-time by means of a keyboard, touch-screen monitor, or other suitable input device at a participant station or terminal. By contrast, a "virtual" participant is not actively involved in the game and does not participate in real-time, but may have a passive position or "stake" in the game. In the case of a "virtual" participant, interaction with the game is normally limited to initially purchasing a "stake" in the game (e.g., one or more bingo cards), and then collecting prizes or winnings at the conclusion of the game.

By way of example, in the casino game keno as well as its state-run lottery equivalents, participants are "virtual" in that the game proceeds without their presence or active participation as soon as a "stake" in acquired by purchasing at least one ticket or game card bearing a selected group of numbers. By comparison, participants engaged in computer-based blackjack, poker, craps, slot machines and the like are "active" participants due to their requisite real-time interaction with the computer in the course of playing the game. Such computer-based games may, of course, be accessed and played in a casino as well as other non-casino settings. Participants that are located geographically distant from the game site could be "active" or "virtual", depending upon the circumstances. For example, in a blackjack game played over the internet, a participant would be an "active" participant since the participation takes places in real-time. By contrast, a person who purchases a lottery ticket to a drawing to be held at a later time would be a "virtual" participant, even though that participant had to take action by purchasing the ticket in order to participate.

Neither "active" nor "virtual" participants should be confused with "simulated" or "imaginary" participants. Some computer-based games are designed to permit an "active" participant to compete against a "simulated" opponent to give the impression or flavor of a real game environment. An example of a "simulated" participant is a traditional bingo game wherein an "active" participant competes against one or more computer-generated opponents, with the winner being either the "active" participant or one of the imaginary computer-generated "simulated" participants.

For games involving "active" participants conducted at a fixed venue such as a casino or charity bingo hall, space and other resource considerations frequently restrict the number of game participants to a finite number. Such considerations include the floor space necessary to accommodate a particular number of chairs and tables or the like, as well as the cost of and space needed for the requisite game devices and personnel needed to conduct the game. However, if the game could be adapted to permit "virtual" participants to participate along with "active" participants, particularly without mandating the physical presence of such "virtual" participants at the game site while the game is being played, the total number of prospective participants for such resource-limiting games can be significantly increased. In a casino environment, this would beneficially enable the casino to meet the gaming needs of a larger number of customers by permitting an individual to participate concurrently in multiple gaming activities including "virtual" participation in multiple games as well as "active" participation in another activity. This would enhance the participant's excitement and enjoyment of the overall gaming activity while additionally increasing the sponsor's revenue potential. Moreover, participation of "virtual" participants in games would increase the prize or winnings potential in games which pay the winner in proportion to the sum wagered by all participants.

Accordingly, another important object of the present invention is to provide a game system and method for accommodating participation by "virtual" participants together with "active" participants in a computer-based game of skill or chance.

SUMMARY OF THE INVENTION

In accordance with the invention, an information display system and method is provided for computer-based games and the like. The display system and method monitors the status of each game participant in real-time as a particular game progresses, and responds to the monitored status information to generate a common information display representing the real-time status of all participants or a selected number of participants (e.g., such as a selected number of leading or ranked participants plus the participant viewing the display) so that each individual participant can view his or her status relative to other game participants. With this information, each participant can assess his or her individual chances of winning as the game proceeds. The invention is suited for rapid and efficient playing of games of chance or skill in a casino environment or the like, wherein the game can accommodate a large number of participants including "active" participants located at the game site and participating in real-time, as well as "virtual" participants who may not be present at the game site.

In a preferred form of the invention, the computer-based game comprises a game of chance or skill, such as bingo or the like, wherein individual participants may acquire a "stake" in the game by appropriately entering game input information on a game terminal linked or networked with a main computer responsible for operating the game. Such game terminals may be located at the game site or elsewhere to accommodate "active" participants desiring to participate in the game in real-time. In addition, game terminals may be provided at any location to accommodate "virtual" participants desiring to acquire a stake in the game but otherwise not participating in real-time. Selected pre-game participant information, particularly for "active" participants, such as participant identification number, participant location at the game site, as well as information regarding each participant's game position (e.g., the number of cards and the number patterns thereon in the case of a bingo game) is combined and made available for viewing by all "active" participants via the common information display. This common information display may comprise a large screen projection-type display present at the game site, and/or a video or other suitable display available at selected computer terminals located at the game site or elsewhere.

As the game proceeds, the display system and method of the present invention updates the common information display in real-time to show the progress of the game (e.g., by displaying each number called in a bingo game) and further to display the status of each game participant. For example, in a bingo game, the common information display would be updated in real-time to mark each called number on the displayed cards for each participant, or for a selected group of participants ranked according to their progress toward winning, thereby permitting the game participants to view their individual status relative to other participants and utilize this information to assess their individual chances of winning. In one preferred form, the common information display is designed to show the individual progress or status of all "active" participants participating in the game. In another preferred form the display system and method is designed to rank the individual progress or status of each participant and then to display the status for a top-ranked selected number of participants currently ranked in a group having the best chances of winning the game plus the status of the participant viewing the display.

Other features and advantages of the present invention will be more apparent from the following detailed description, taken in conjunction with the accompanying drawings which illustrate, by way of example, the principles of the invention.

BRIEF DESCRIPTION OF THE DRAWINGS

The accompany drawings illustrate the invention. In such drawings:

FIG. 1 is a diagrammatic view of an exemplary common information display bearing game status information for a large number of game participants;

DETAILED DESCRIPTION OF THE PREFERRED EMBODIMENT

Figure 1:
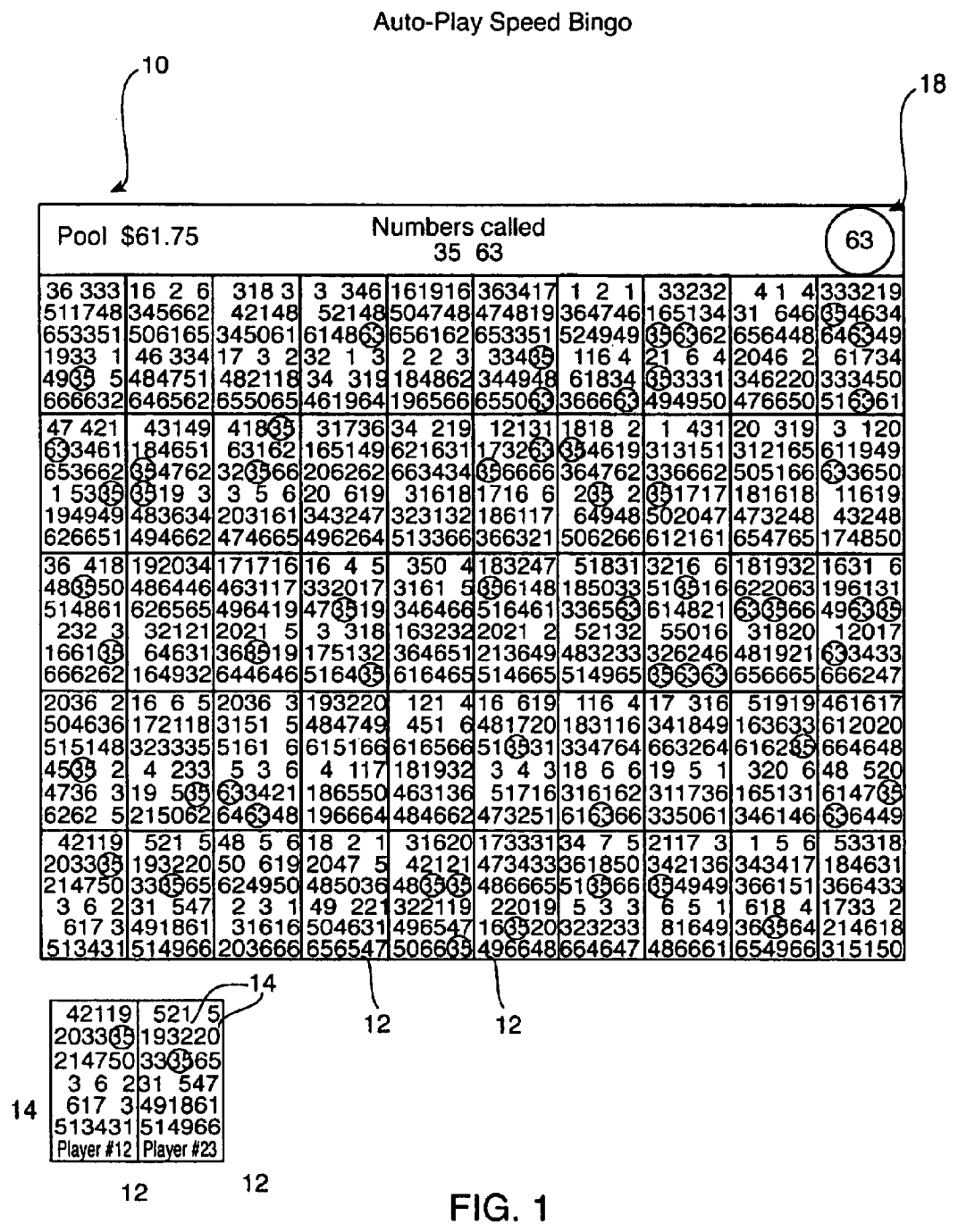
Figure 2:
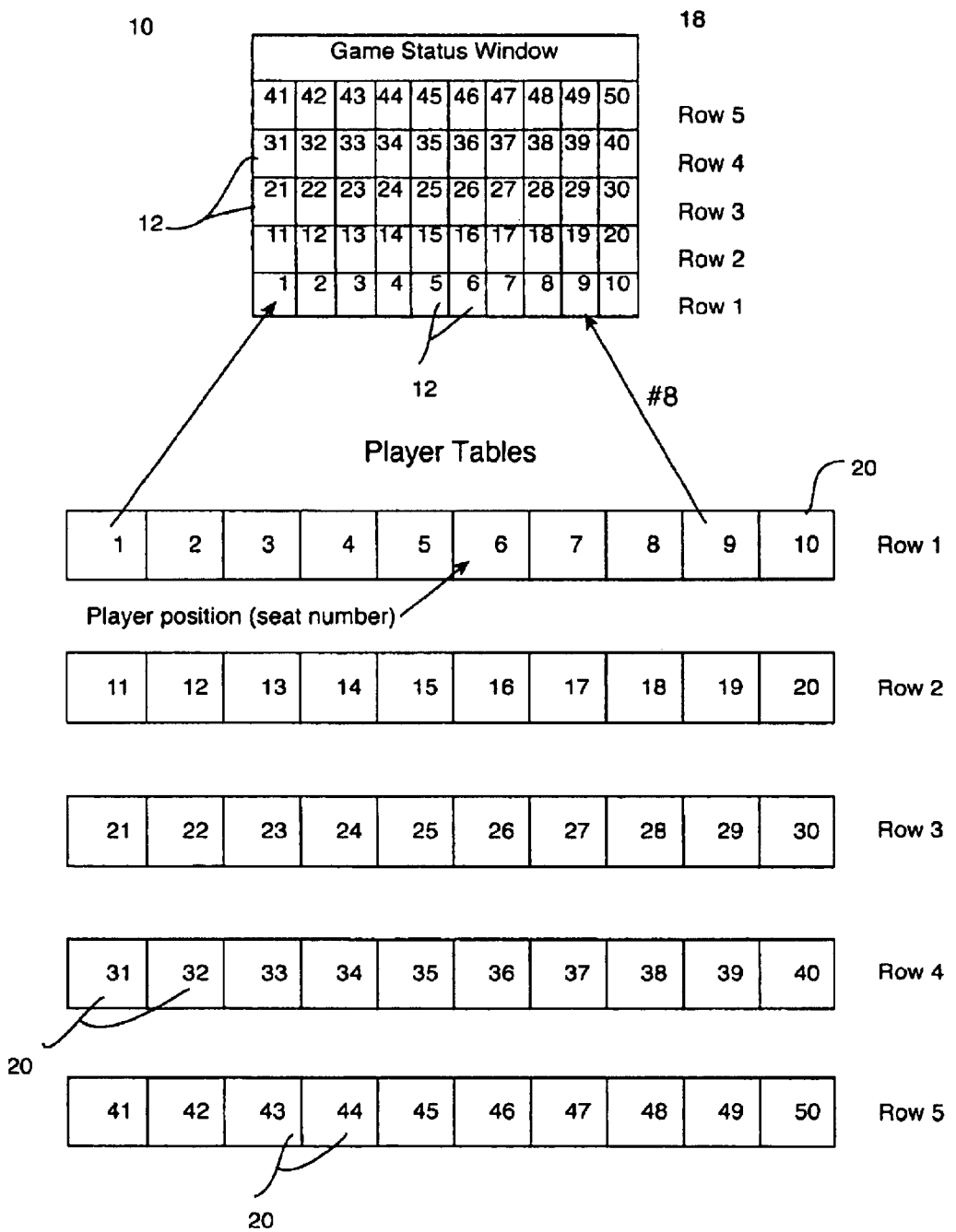
FIG. 2 is a schematic diagram showing a preferred correlation between the locations of participant game status windows on the common information display, with the physical locations of participants at designated seats or the like at a game site.

As shown in the exemplary drawings, a computer-based display system and method is provided for monitoring and displaying the real-time status of multiple participants engaged in a game of chance or skill. The display system and method provides a common information display referred to generally in FIGS. 1 and 2 by the reference numeral 10, wherein this display 10 is viewable by all game participants. The information display includes data such as the game progress, together with information regarding the real-time status of each participant by position or of a selected number of participants by ranking so that each participant can assess his or her game progress relative to other contestants as the game proceeds. With this information which is available to each participant prior to and during the game, each participant can assess his or her individual chances of winning. In addition, the display system and method is designed to accommodate participation by both "active" participants who participate in the game in real-time, as well as passive or "virtual" participants who do not participate in the game in real-time and thus are not required to be present at the game site.

The computer-based display system and method of the present invention is designed to enhance the overall integrity of the game and also to enhance participant participation and enjoyment by providing each "active" participant with additional information regarding the progress and status of the game in an on-going, real-time manner. For example, the integrity of the game is enhanced by utilizing the common information display 10 to disclose in full to all participants a variety of pre-game, game-in-progress, and game winner information. With such information, each participant has an opportunity to assess or estimate his or her statistical chances of winning, wherein this factor enhances the integrity of the game while additionally affording each participant an opportunity to make important decisions during play and/or whether to continue playing by participation in the next game. These factors contribute to the overall satisfaction and excitement experienced by each participant. Moreover, the display system and method beneficially accommodates additional participation by "virtual" participants to permit individuals to enhance their overall satisfaction and enjoyment by participating concurrently in multiple gaming activities, while potentially increasing potential revenue to the casino or the like. In addition, by including "virtual" participants, the betting pool for a game can be increased to correspondingly increase the sum paid to the winner.

For sake of clarity and ease of description, the game display system and method of the present invention will be described herein in the context of "Auto-Play Speed Bingo" (APSB), which is an automated variant of a traditional rapid-play bingo game commonly known as "speed" bingo, "bullet" bingo, or "lightning" bingo. However, it will be recognized and understood by persons skilled in the art that the invention may be applied to other forms of bingo as well as a wide variety of other computer-based games of chance or skill designed for participation by multiple participants. It will be further recognized and understood that the invention may also be adapted for use in other game or game-type applications such as educational environments in a group-paced learning system with competitive scoring among multiple students.

By way of general background, bingo is generally defined as a game of chance in which multiple participants seek to obtain a predefined winning pattern by matching numbers or symbols with a preprinted or predefined array of numbers or symbols on one or more uniquely configured game cards. In a typical game, randomly selected numbers are called in succession by the game sponsor or operator, and the game proceeds until at least one game card in play achieves the winning pattern. In traditional bingo as played in the United States, a bingo card includes twenty five spaces arranged in five rows and five columns (wherein twenty four of the spaces are numbered and one is left blank), and the game operator selects numbers at random from a field of numbers (i.e., a field of 75 numbers). In variants, the number and arrangement of spaces on each card as well as the field size of possible numbers can differ.

In the case of "speed" bingo, each card typically bears three numbered spaces arranged, for example, in a single vertical column. This game is designed for rapid play (i.e., 40–60 games per hour). As an illustrative example, a "speed" bingo game may require each participant to pay a specified sum or "ante" to the game operator to obtain each bingo card. Then, as the game proceeds by the operator calling randomly selected numbers, each participant marks his or her card or cards with one of three coins or chips (one for each space) when a matched number is called. When at least one card in play achieves a match for all three numbers, the cardholder is declared the winner. Unused coin or chips are then collected from the losing participants and represent the prize pool from which the winning participant is paid. The size of the betting pool can thus vary widely, depending upon the number of cards played, the length of the game (i.e., how many numbers are called before a winning pattern is achieved), together with the value attributable to each matched number. Unfortunately, in a non-computer-based format, "speed" bingo is notoriously labor-intensive by requiring a staff of many individuals to provide cards to participants, collect and count money, call numbers, and pay winners, in order to achieve the desired rapid repetitious playing of games.

The game display and method of the present invention is shown and described in the context of a computer-based game of "speed" bingo in a fixed venue. The illustrative embodiment depicts the common information display 10 (FIGS. 1 and 2) in a form designed to display the real-time status of up to 50 "active" game participants. It will be understood that all participants may or may not be present at the game site, and further that the actual number of game participants may substantially exceed the capacity of the display 10 by permitting additional participation by "virtual" participants who participate in a passive manner (i.e., do not participate in real-time) and thus are not required to be physically present at the game site. Moreover, it will be understood that the geometry of the common information display may be altered to accommodate a greater or lesser number of participants.

Figure 3:
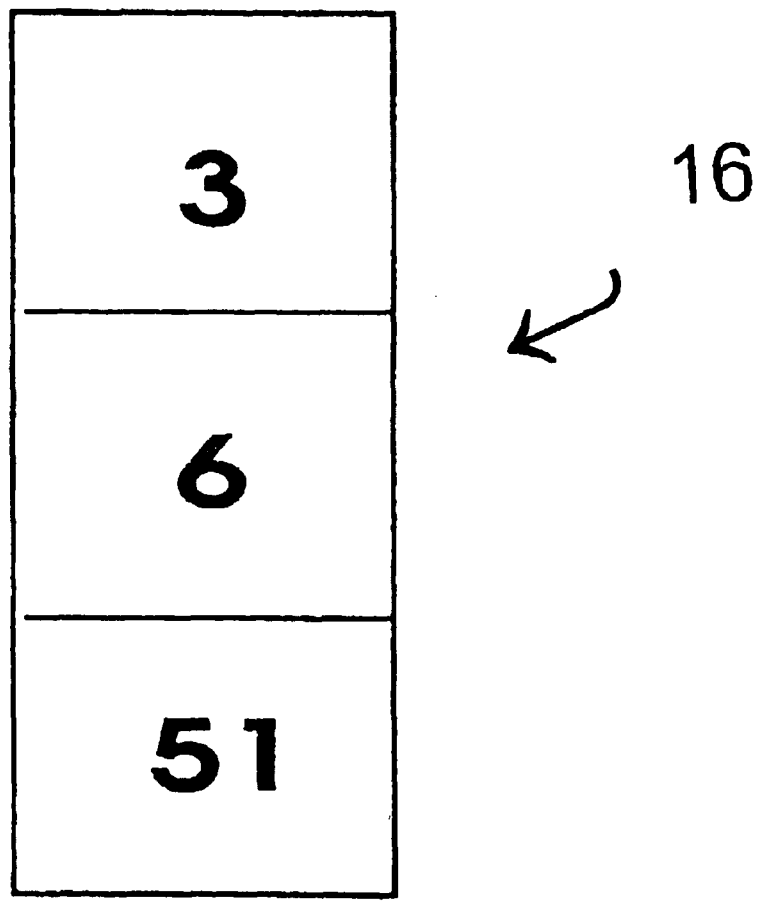
FIG. 3 illustrates an exemplary game card of the type used in playing a variation of bingo known commonly as "speed bingo"

FIG. 1 shows an exemplary common information display 10 composed in the form of fifty participant windows 12 arranged in 5 rows each including 10 vertical columns. Each participant window 12 identifies the specific participant, as by marking the windows 12 with the participant identification numbers 1 through 50 as shown, or by other suitable means such as the physical location of each participant in a room at the game site (e.g., by seat location). Each participant window 12 is subdivided into a number of sectors or regions 14 in which are respectively displayed information regarding that participant's position in the game. In the context of "speed" bingo, these sectors 14 may respectively display the identified participant's card or cards, by specifically displaying three numbers arranged in a vertical column for each such card. In this regard, an individual card 16 (which can be a physical card or otherwise represented by an image on a monitor or other computer display device) bearing an array of three numbers is shown in FIG. 3, and the same array of three numbers is displayed within one of the sectors 14 applicable to Participant #1 in the appropriate participant window 12 as viewed in FIG. 1 at the lower left corner of the display 10. Each participant window 12 may be configured to display multiple cards, with FIG. 1 illustrating a total of six sectors for displaying six different cards for each participant. It will be understood that the display may be configured to accommodate different numbers of cards per participant, and also that one or more sectors applicable to a given participant may appear blank on the display 10 in the event that such participant elects not to play the maximum allowable number of cards in a given game.

An upper title bar or status window 18 is provided on the common information display 10 and includes selected general information regarding the game. In the example depicted in FIG. 1, the status window 18 identifies the size of the betting pool which may be fixed at the start of the game or otherwise updated in real-time as the game proceeds. In addition, the status window 18 may include other information regarding the progress and status of the game as it proceeds, such as a list of the numbers already called in a bingo game (i.e., numbers 35 and 63 in the illustrative example, including the last number called [#63] shown in the right hand corner). Additional information such as the specific game number, in a repeating succession of games, may also be provided.

In the preferred form, the information display 10 comprises a large screen image on the order of 8–10 feet in height and about 10–12 feet in width, wherein this image may comprise a projection-type video image and is displayed at the game site for common viewing by all participants at that location. In this regard, the arrangement of numbered participant windows 12 on the information display 10 is desirably correlated with a counterpart arrangement of numbered participant locations located typically at the game site in a position to view the display 10 as the game proceeds. FIG. 2 shows the large screen display 10 with numbered participant windows 12 arranged in 5 rows which correspond with 5 rows of similarly numbered participant seats (and/or tables) 20. With this configuration, each participant present at the game site can visually monitor his or her own progress as the game proceeds, as well as the progress of other participants at the game site. Moreover, by correlating the numbered participant seats with the numbered participant windows 12, each participant can determine the location of each other participant at the game site. Alternatively, and preferably in addition, the information display 10 or selected portions of the information contained thereon may be viewable at other selected locations which can be remote from the game site by means of a computer monitor or other suitable display device. Additional relevant information may also be viewable on the display 10, such as specific rules of play, the amount of the "ante" per card, and the value or wager associated with each card in play.

Figure 4:
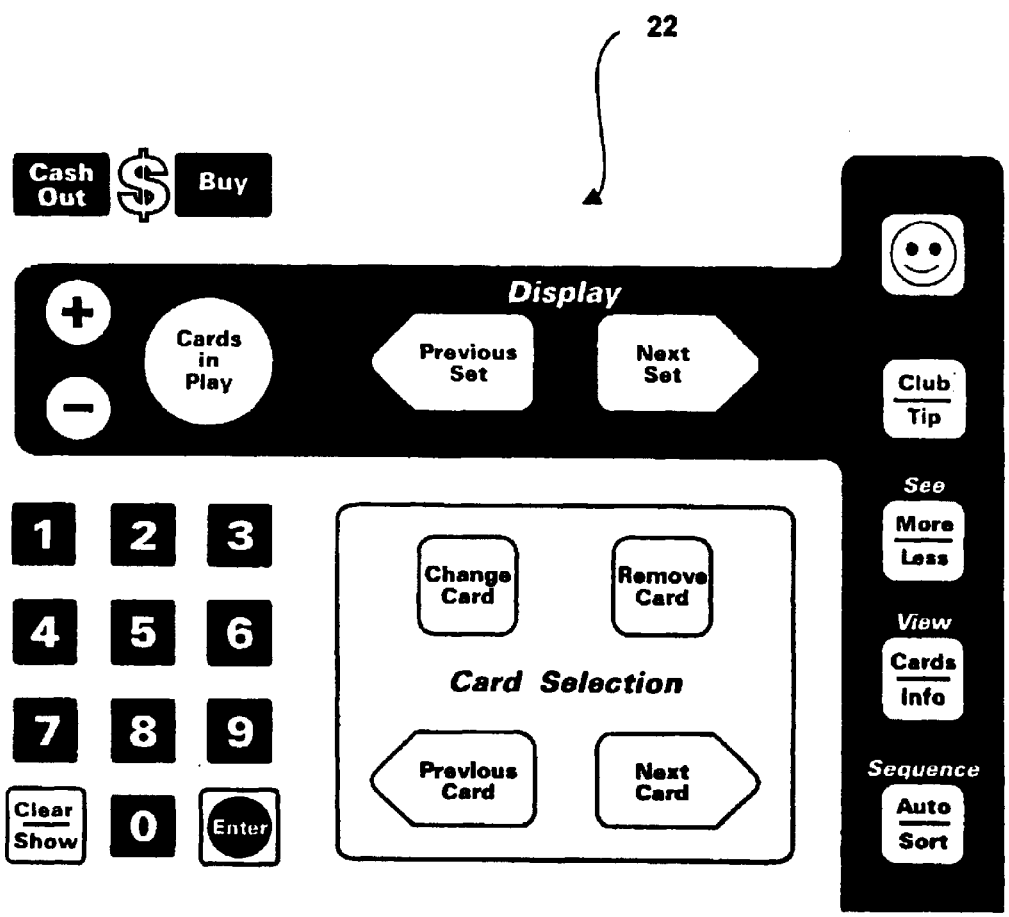
FIG. 4 is a diagrammatic view of an exemplary participant keyboard or game terminal display for access by a participant to enter and play a computer-based game such as speed bingo.

Data is inputted to the common information display 10 by means of a plurality of individual participant input terminals or keyboards 22. FIG. 4 illustrates one configuration for a participant keyboard, to include appropriate input keys or the like to permit participant selection of one or more cards (in the case of a bingo game), etc. A plurality of such keyboards 22 will normally be present at the game site in one-to-one association with the numbered participant seats 20 (FIG. 2). Each of the input terminals or keyboards 22 is linked with a main game computer 24 (FIGS. 5 and 6a–6b) which compiles or aggregates the inputted data, and responds by formulating and composing the information display 10.

Each game cycle normally comprises a regular sequence of speed bingo ("APSB") under the operation and control of the main game computer 24. As shown, the computer is initially configured and/or programmed to set up the basic game and facilities parameters, including basic rules of play such as game design, the number of potential participants, betting limits, etc. Then, the computer is programmed to set up a game schedule, typically a repeating sequence of games in the case of bingo. In a pre-game mode, each "active" participant is afforded an opportunity to inspect, select and purchase individual game cards from a library of cards stored in the main computer, specify the number of cards to be played, and purchase additional game credits, utilizing the participant keyboards 22 (FIG. 4). This pre-game cycle is normally concluded by a brief lock-out interval during which participant keyboards 22 are locked out, and no further changes or additional participants are permitted. Thereafter, the game starts and proceeds, preferably automatically, to a game-in-progress phase during which bingo numbers are randomly selected by the main computer 24 (or by the game operator using a conventional selection device such as a bingo ball blower), the selected numbers are listed on the common display 10, and each participant's card is automatically marked according to number matches. Importantly, each "active" participant's card or cards are updated and marked on the common information display 10 in real-time as the numbers are called. Each participant input terminal or keyboard 22 may also be associated with a visual display (not shown) showing that participant's card or cards which are updated and marked as the game proceeds. When the game computer or an individual participant (using the keyboard 22 or otherwise notifying the game operator) determines that one or more cards has achieved the winning pattern, "bingo" is called and the common information display 10 is updated to provide real-time notification to participants regarding the existence and location of the winner at the game site. With respect to the exemplary information display 10 shown in FIG. 1, such winner identification may occur by highlighting the winning card sector 14 by bright illumination, or by flashing or colored lighting, and/or also by appropriate audio announcement or audio signal. At this time, the game terminates, again preferably automatically, and proceeds to a post-game cycle wherein prizes are credited to the winner or winners, and loser accounts are debited. Alternately, the computer 24 may be programmed to credit or debit participant accounts as each number is called during the game. At the conclusion of the post-game phase, the game will normally recycle to the next game in sequence.

Figure 5:
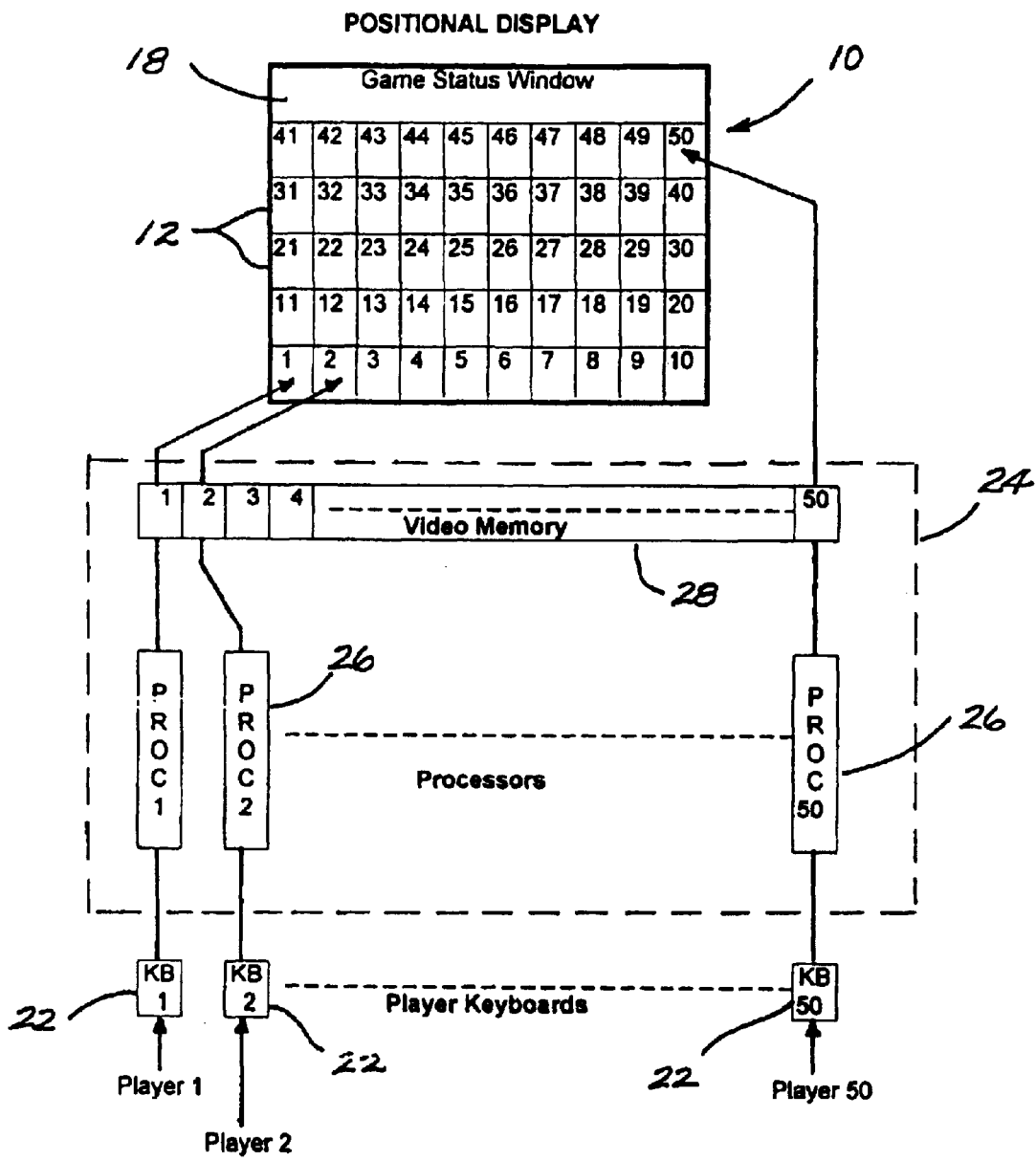
FIG. 5 is a schematic diagram showing the improved information and display system according to one preferred form of the invention.
Figure 6A:
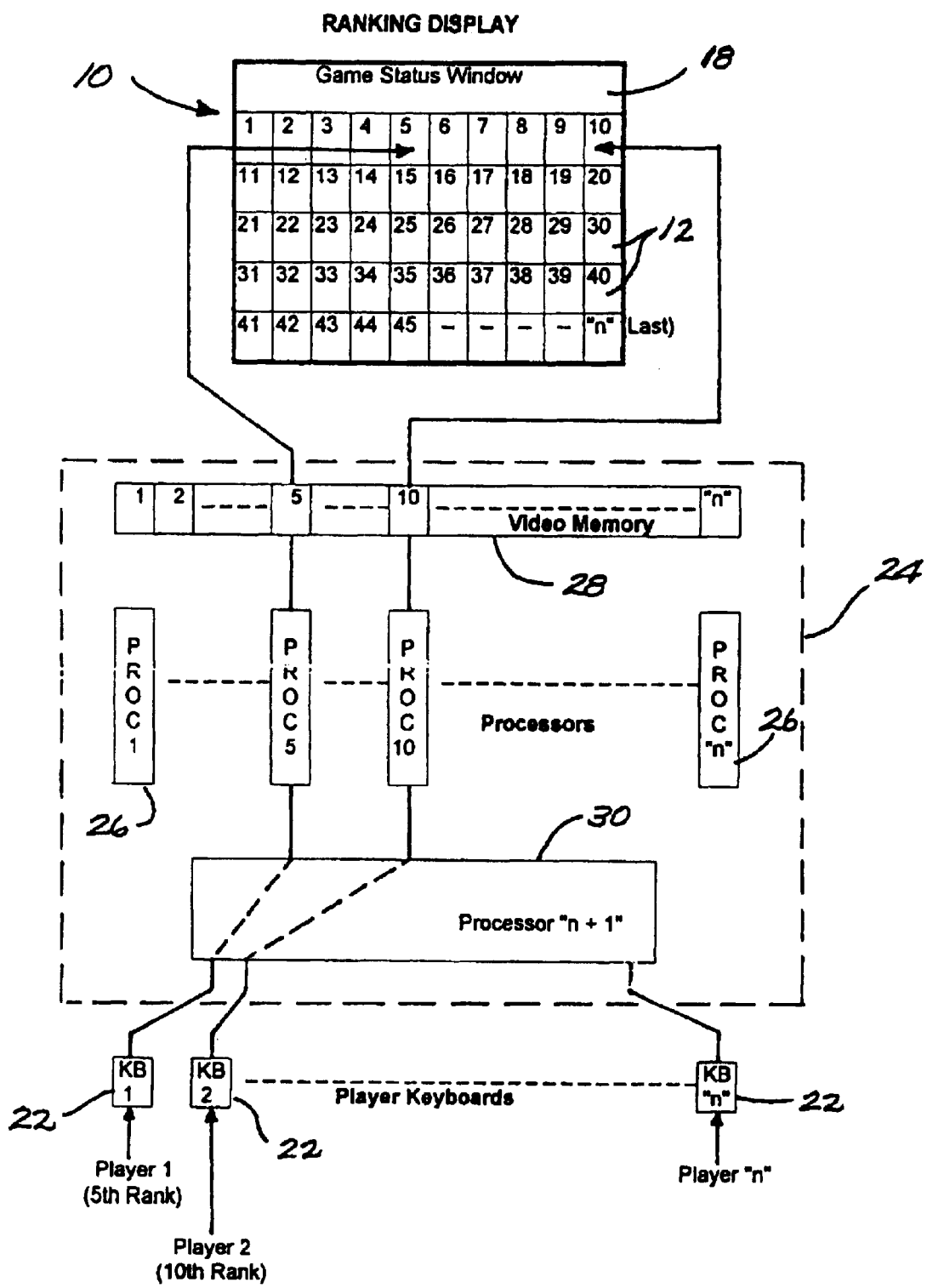
FIG. 6a is a schematic diagram similar to FIG. 5, but depicting the information and display system according to an alternative preferred form of the invention.
Figure 6B:
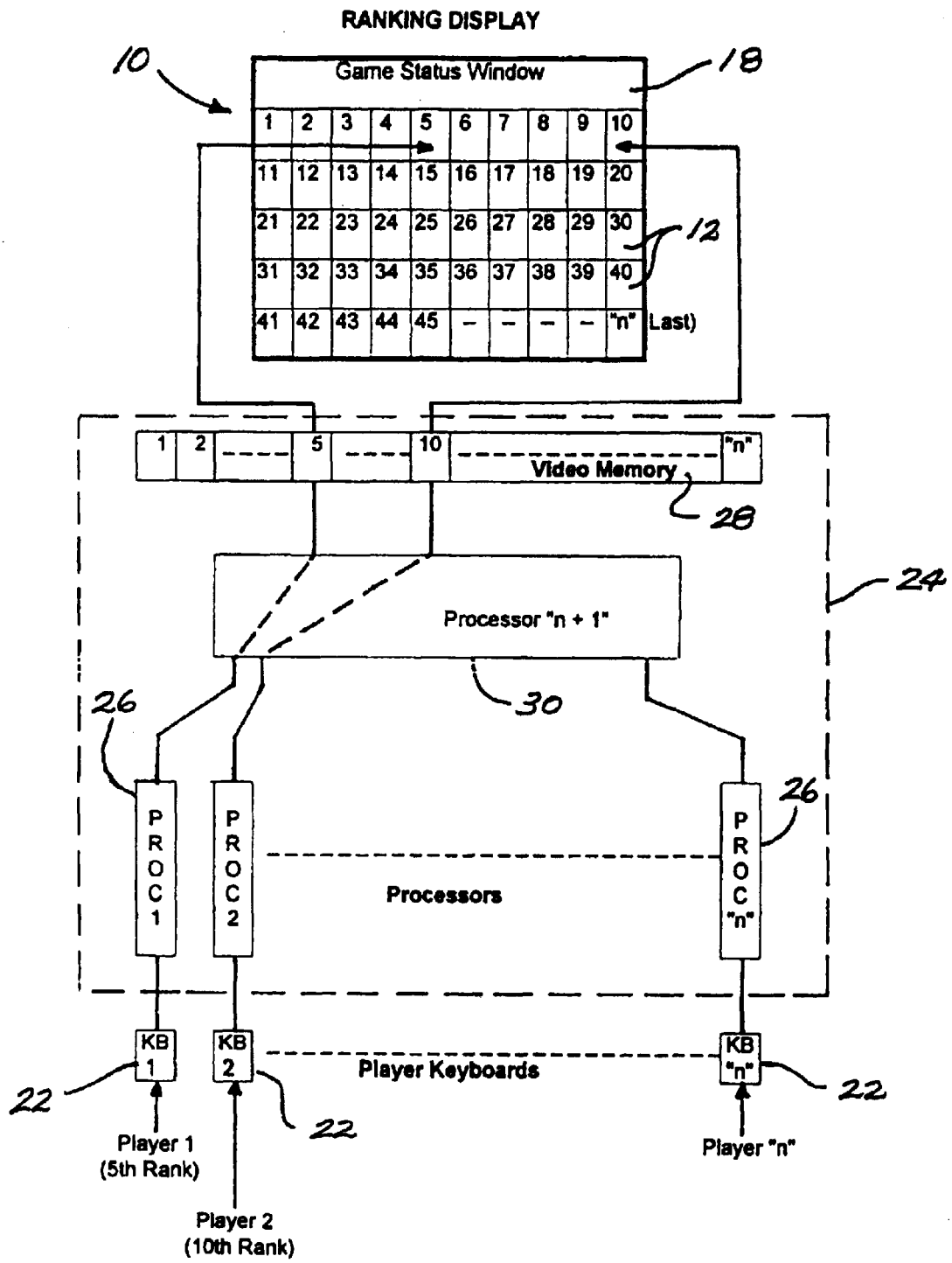
FIG. 6b is a schematic diagram similar to FIG. 6a, but showing another alternative preferred form of the information and display system of the invention.
Figure 7:
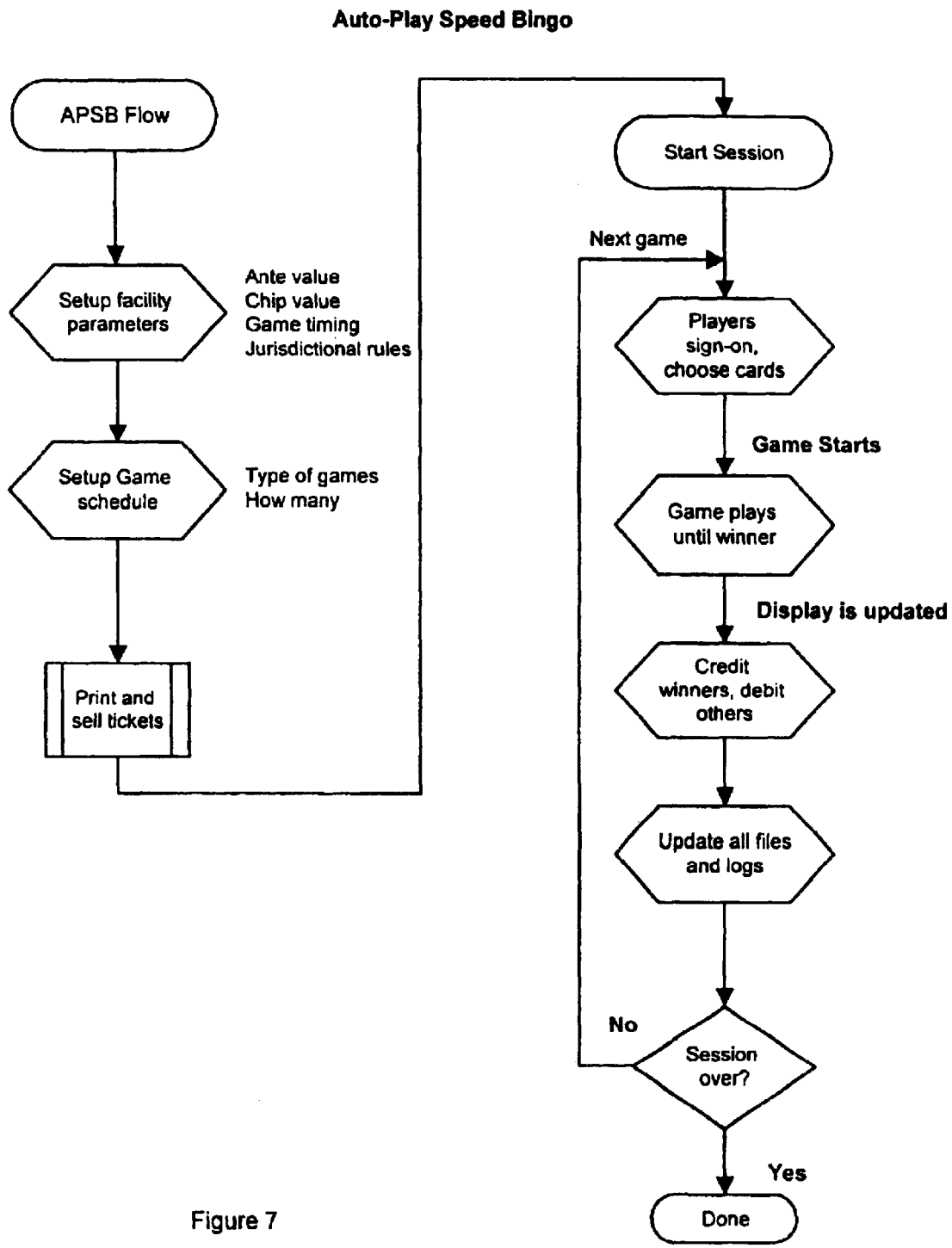
FIG. 7 is a flow chart depicting the game display system and method in the context of an auto-play speed bingo game.

FIGS. 5 and 6a–6b show alternative preferred hardware implementations of the common information display 10 wherein the individual participant windows 12 are associated respectively with the positions or locations of participants in a room at the game site (FIG. 5), or with the relative ranking of participants according to their individual progress toward winning the game (FIGS. 6a and 6b). In these examples, the display is implemented using simultaneous multiple processors or computer-like devices (defined as either general or special purpose computer processors or computer-like devices which process data) which may be either contained within the main game computer 24 as illustrated, or within separate devices suitably linked together to form a composite game processor system.

More particularly, FIG. 5 shows a plurality of participant keyboards or input terminals 22 which are preferably arranged within a room at the game site in rows associated with numbered seats (as shown in FIG. 2) associated with the numbered participant windows 12 on the information display 10. A corresponding number of processors 26 ("n" processors) are provided such that each participant game window 12 may be associated with one and only one processor 26, and further that a pre-allocated portion of a video memory 28 (such as a very fast random access memory storage device from which the composite image information will be transferred to the display device) which corresponds to the portion of the display 10 for a particular participant game window 12 will be addressable or connected to a specific one of the multiple processors 26. For example, in the participant position display arrangement shown in FIG. 5, participant #1's game window 12 is associated with a first one of the processors 26, participant #2's game window 12 is associated with a second one of the processors 26, and so forth for each of the 50 game windows shown on the illustrative display 10.

FIG. 6a shows a hardware implementation for a ranking display. In this embodiment, the keyboards 22 associated with the participants are respectively coupled by a ranking processor 30 to a specific one the series of processors 26 according to real-time participant ranking or score as the game proceeds, wherein these processors 26 are each coupled in turn via the video memory 28 with a respective one of the participant game windows 12. Thus, the game window 12 associated with the participant having the highest ranking or real-time score may be fixed in position on the information display 10, such as the game window 12 appearing in the upper left corner of the display. In the example shown, the keyboard 22 associated with participant #1 is coupled by the appropriate processor 26 and portion of the video memory 28 to a participant game window 12 associated with the fifth-ranked participant, thereby indicating that participant #1 is in fifth position. Similarly, FIG. 6a shows the keyboard 22 associated with participant #2 linked via the appropriate processor 26 and portion of the video memory 28 to a participant game window 12 associated with the tenth-ranked participant, thereby indicating that participant #2 is in tenth position. Thus, each participant may, by observing the information display 10, view status information for each of the ranked participants and thereby compare his or her own real-time status against the displayed ranked participants to assess his or her chances of winning the game.

FIG. 6b illustrates an alternative hardware implementation of the invention for a ranking display. In this embodiment, the participant keyboards 22 are respectively associated with a corresponding one of the processors 26. The ranking processor 30 in interposed between the bank of individual processors 26 and the video memory 28. The ranking processor ranks the individual participants in real-time as the game progresses, and links each participant to the appropriate portion of the video memory 28 according to participant ranking. The video memory in turn assigns the information applicable to each participant to the appropriate game window 12 according to participant ranking. In the example shown, participant #1 is coupled to a game window 12 associated with the fifth-ranked participant, and participant #2 is coupled to a game window 12 associated with the tenth-ranked participant.

Each of the display positions (representing a particular rank) in the memory may be defined according to the needs of a particular game or implementation. For example, in FIGS. 6a and 6b, the fifth-ranked participant is shown in the fifth position on the top row of the display windows 12. However, other window ranking arrangements can be used, such as arranging the ranked windows in vertical rows.

In the example of speed bingo, the computer 24 would thus re-analyze and re-arrange the participant windows 12 after each number is called to update the display by participant rank. In other words, as viewed in the ranked displays of FIGS. 6a and 6b, the particular location of status information for a given participant would float within the display according to the real-time ranking of that participant as the game proceeds. This ranking approach is particularly useful wherein the number of game participants exceeds the number of participant boxes 12 on the information display 10. Persons skilled in the art will appreciate that alternative hardware and/or software configurations may be employed for formulating the display 10 by participant location (FIG. 5) or by participant ranking (FIGS. 6a–6b). It will be recognized and understood by persons skilled in the art that the referenced video memory 28 may be located within the system of game controlling processors, or may be located externally of the system such as in a projection device or in a large screen display monitor or the like.

Figure 8A:
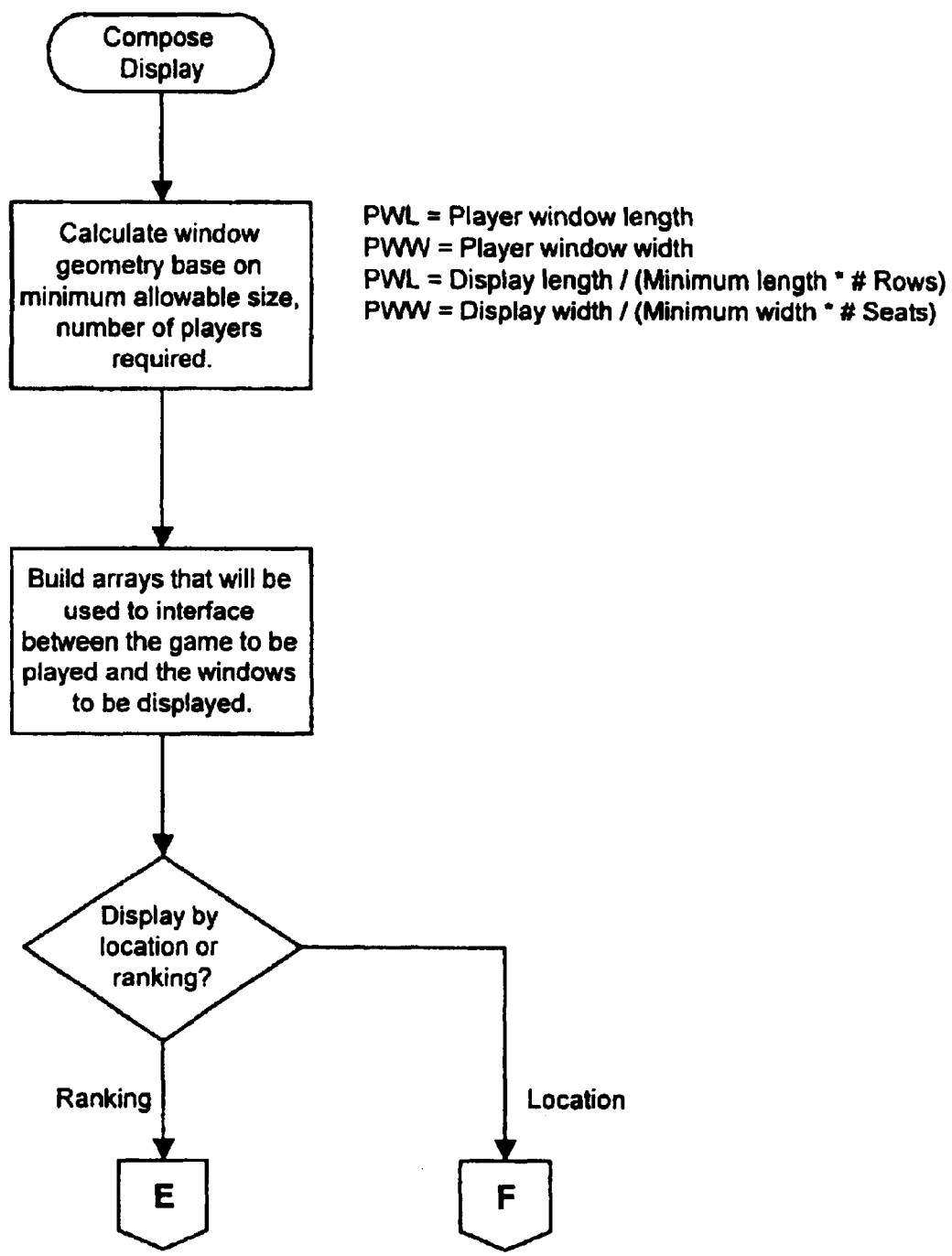
FIGS. 8a through 8e represent a flow chart illustrating updating of the common information display as the game of FIG. 7 proceeds.
Figure 8B:
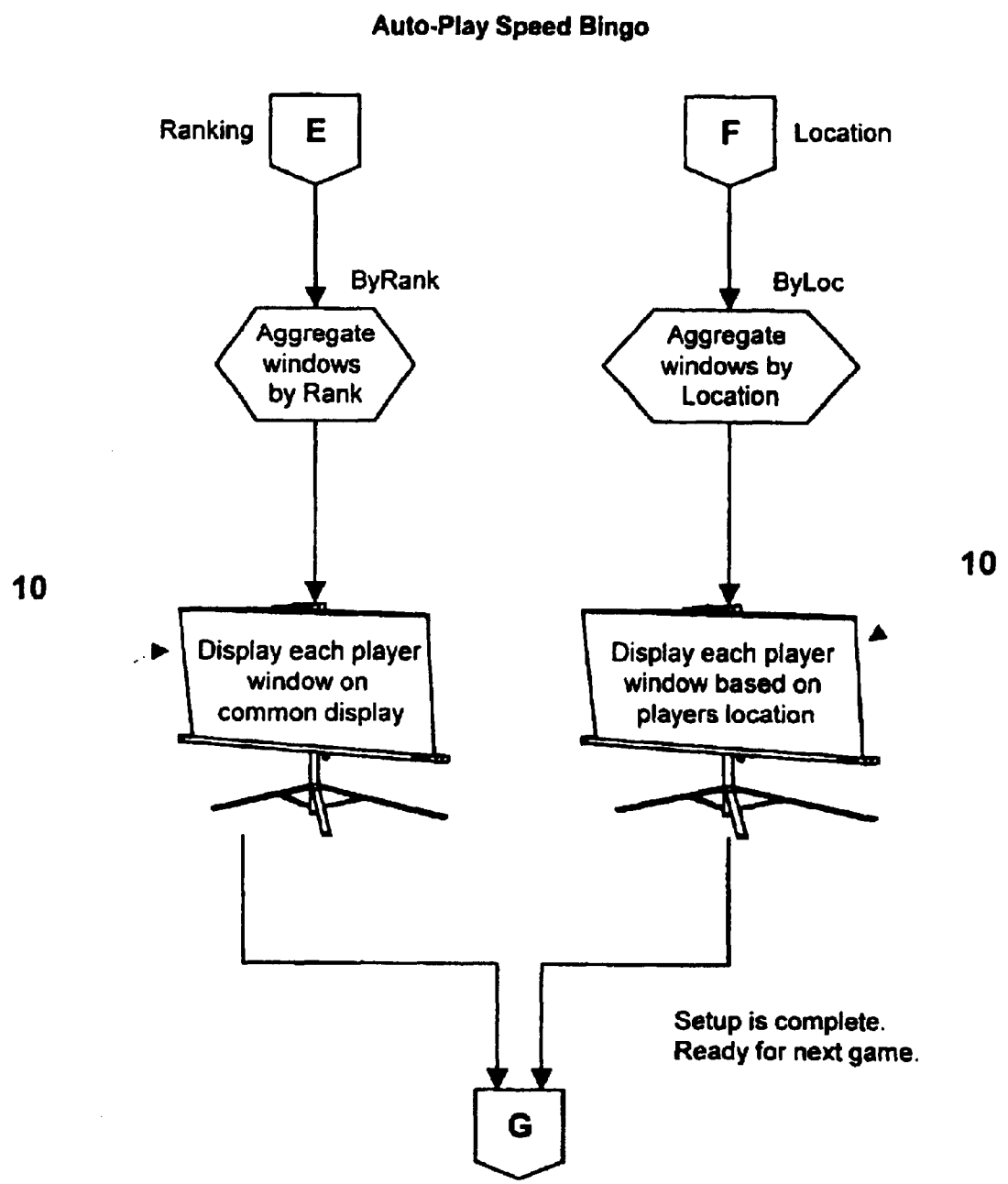

FIGS. 8a–8e comprise a more detailed flow chart representing computer-based composition of the common information display 10 as the exemplary speed bingo game proceeds. More specifically, FIG. 8a shows programming of game parameters and/or other suitable configuration of the computer system for initially composing the display 10, including determination of the number and size of each participant window 12, and the participant status data to be displayed therein. The computer then constructs the array of participant windows 12 constituting the information display 10. The computer is then programmed for suitably interfacing with each participant as by number, account number, seat location, or other relevant participant data. At this juncture, a determination is made regarding the composition of the display 10 in terms of displaying participant status for all participants according to location in the room at the game site (as viewed in FIGS. 1–2 and 5), or alternately displaying participant status according to individual participant ranking as the game proceeds (as viewed in FIG. 6a or 6b). Thereafter, the participant information is aggregated and displayed by location or rank as shown in FIG. 8b. In this regard, when the display is set to organize the participants by ranking, the initial pre-game display may be blank particularly in the event that the number of participants exceeds the number of participant windows 12 on the display.

Figure 8C:
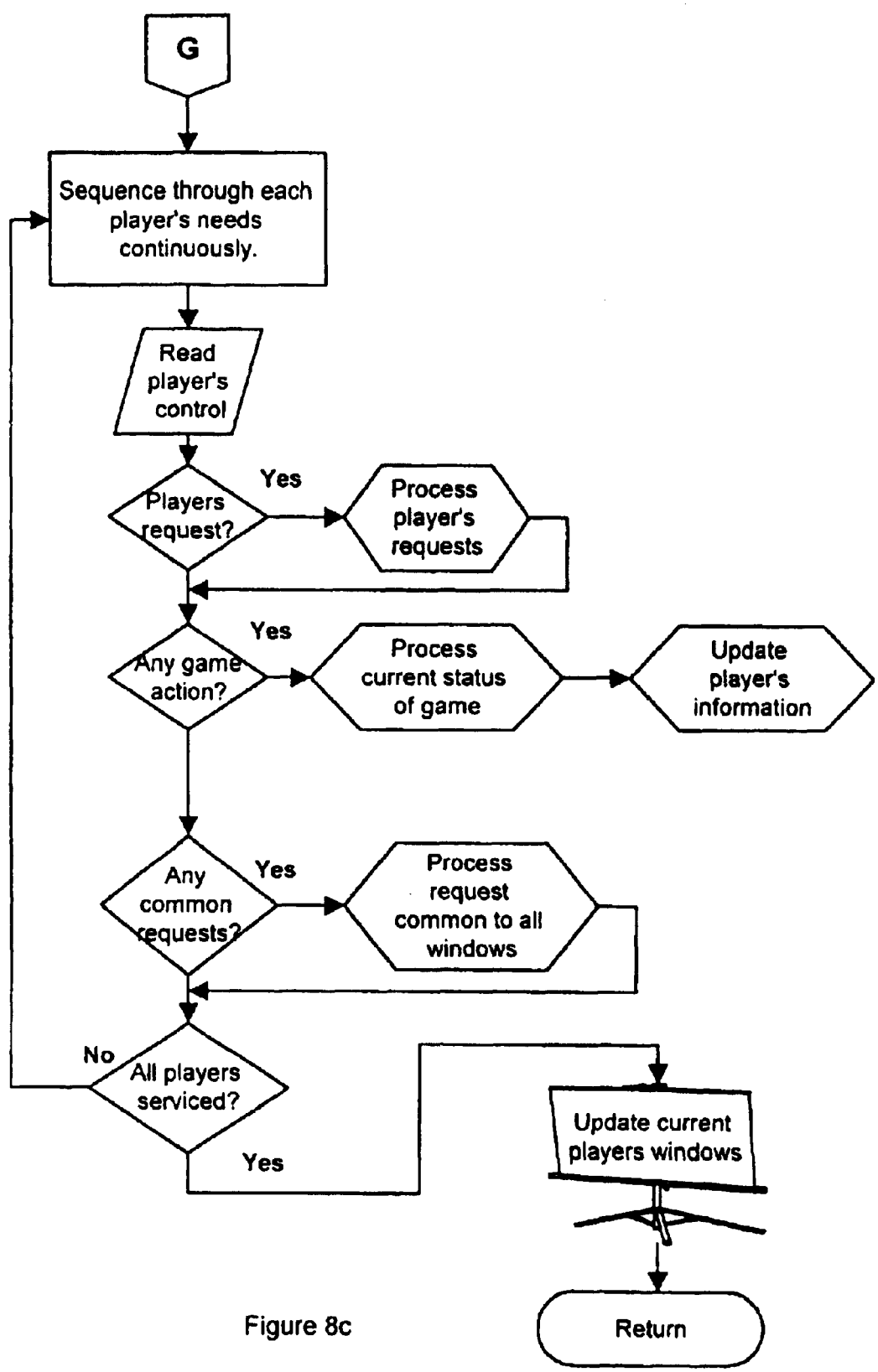
Figure 8D:
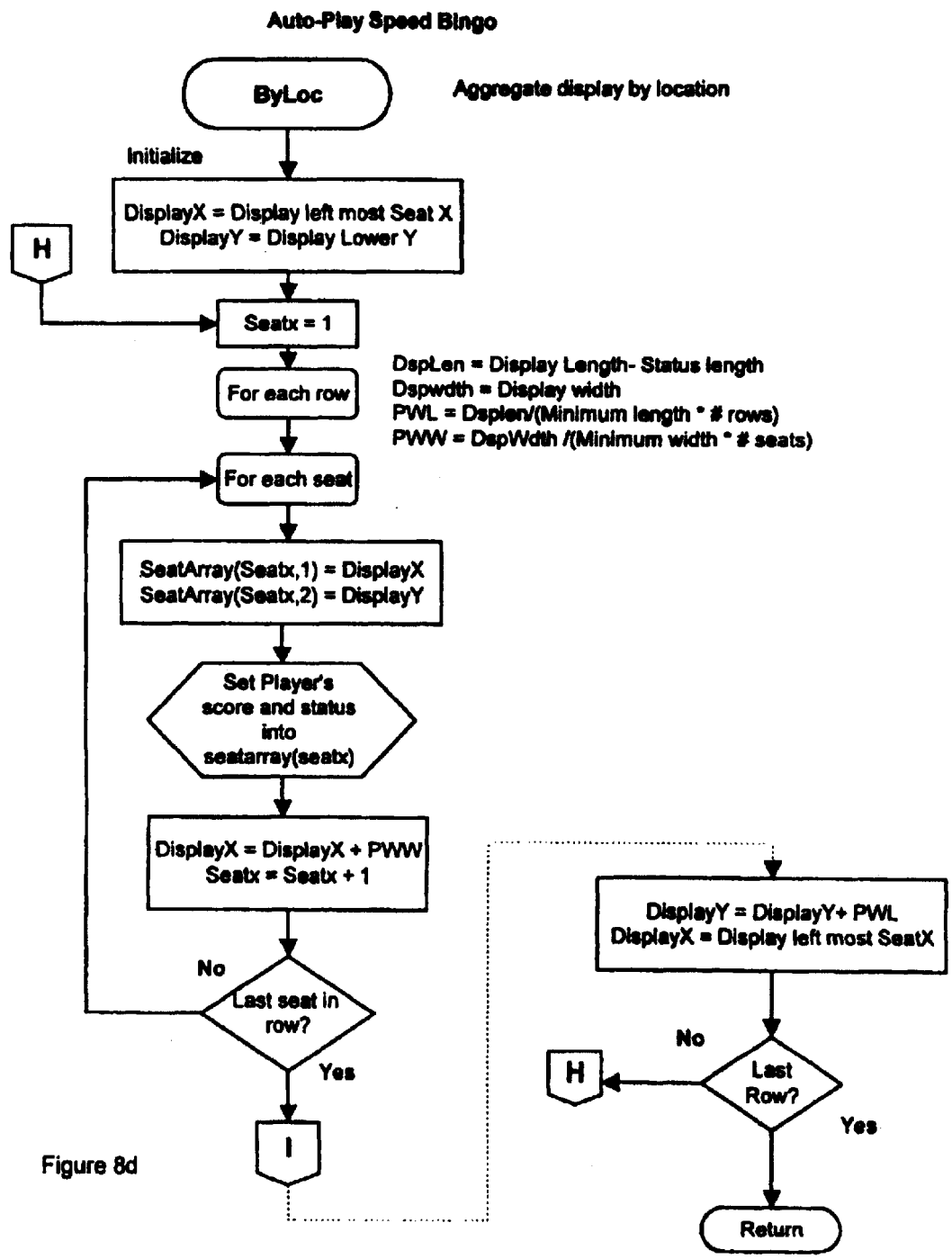
Figure 8E:
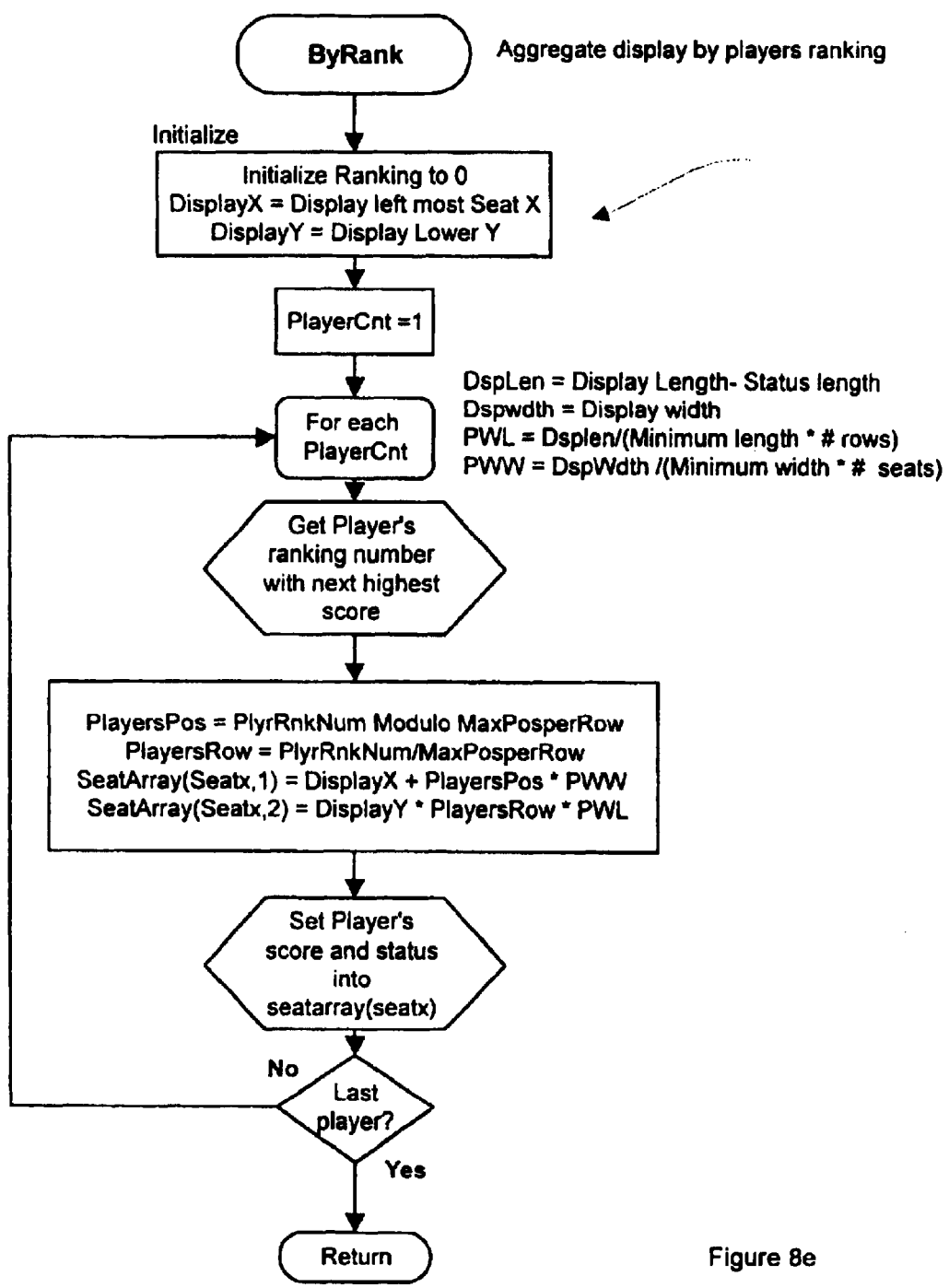

FIG. 8c is a continuation of the flow chart to illustrate operation of the game in coordination with participant input via the keyboards 22. As shown, following pre-game set-up of the display as shown in FIGS. 8a–b, the computer receives data and related game preparation requests inputted by each participant and processes that data compose and visually present the common information display 10. At the conclusion of the pre-game mode, the game starts (preferably automatically) by computer-generated random selection of the bingo numbers, or by other number selection means such as a conventional ball blower device. In response to this game action (i.e., calling of numbers in a bingo game), the computer reviews the participant cards and updates the display window 12 applicable to each participant. This process continues repeatedly as the game proceeds to a conclusion. FIG. 8d is a flow chart illustrating computer operation to compile and display participant status information based on participant position or location in a room or the like where the game is played. By contrast, FIG. 8e is a flow chart illustrating computer operation to compile and display participant status information based on real-time ranking of participant scores as the game proceeds.

The display system and method of the present invention beneficially accommodates participation by a large and virtually infinite number of "virtual" participants who do not need to be present at the game site. In this regard, the number of "active" participants who can participate in the game at the game site is inherently subject to physical resource limitations such as room size, the number of accessible participant keyboards 22 in the room, etc. However, in a computer controlled game environment, other participants may desire to participate without attendance, by permitting computer-generated selection of one or more bingo cards 16 or the like, and by instructing the computer in advance regarding participation parameters such as the number of games to play, the number of cards 16 to play in each game, and the wager amounts, etc. Such participation by "virtual" participants beneficially increases the wager pool and thereby increases the prize paid to the winner. Real-time display of game status information for "virtual" participants can be included on the common information display 10 when the total number of "active" and "virtual" participants does not exceed the number of participants windows 12 on the display. However, when the total number of participants exceeds the number of participant windows 12, the display system may be set to display participant status by ranking as previously described.

In one alternative, the display 10 can be adapted to show game status information for "active" participants in the array of participant windows 12, and to present relevant individual or summary information regarding the participation of "virtual" participants in a special game status window. Examples of such "virtual" participant information could include a listing of the number of participating "virtual" participants, the percentage of total cards in play attributable to "virtual" participants, and/or the percentage of the wager pool attributable to "virtual" participants. Such listing of information regarding "virtual" participants can be incorporated into the status window 18 (FIG. 1) at the top of the display 10, or at any other suitable and convenient location on or in association with the display (such as in the window allocated to participant #50 as shown in FIGS. 1–2 and 5, or as represented by the summary game status window 32 in FIG. 9d). In the event that a "virtual" participant holds a winning card, such winning card would be displayed within such special status window at the conclusion of a game.

More particularly, and with reference to the flow chart of FIGS. 9a–9e, a "virtual" participant would be afforded an opportunity to purchase a selected stake in the game from a cashier or computer-operated kiosk terminal or the like (FIG. 9a) positioned an any convenient location at the game site or elsewhere. At the time of purchase, the "virtual" participant would specify his or her game participation by a variety of optional parameters, such as the number of cards to be played, the identification number or sequence of identification numbers for a succession of games to be played, the amount or amounts to be wagered, etc. Game participation could be based upon an account from which wagers would be debited and to which winnings would be credited, with instructions to halt play when the account is depleted, or when a specified amount of winnings are accumulated, or at the conclusion of a prestated time interval. Such participation by each "virtual" participant would be inputted into the game computer 24, with the "virtual" participant receiving appropriate documentation or tickets or the like to verify his or her game "stake".

Figure 9A:
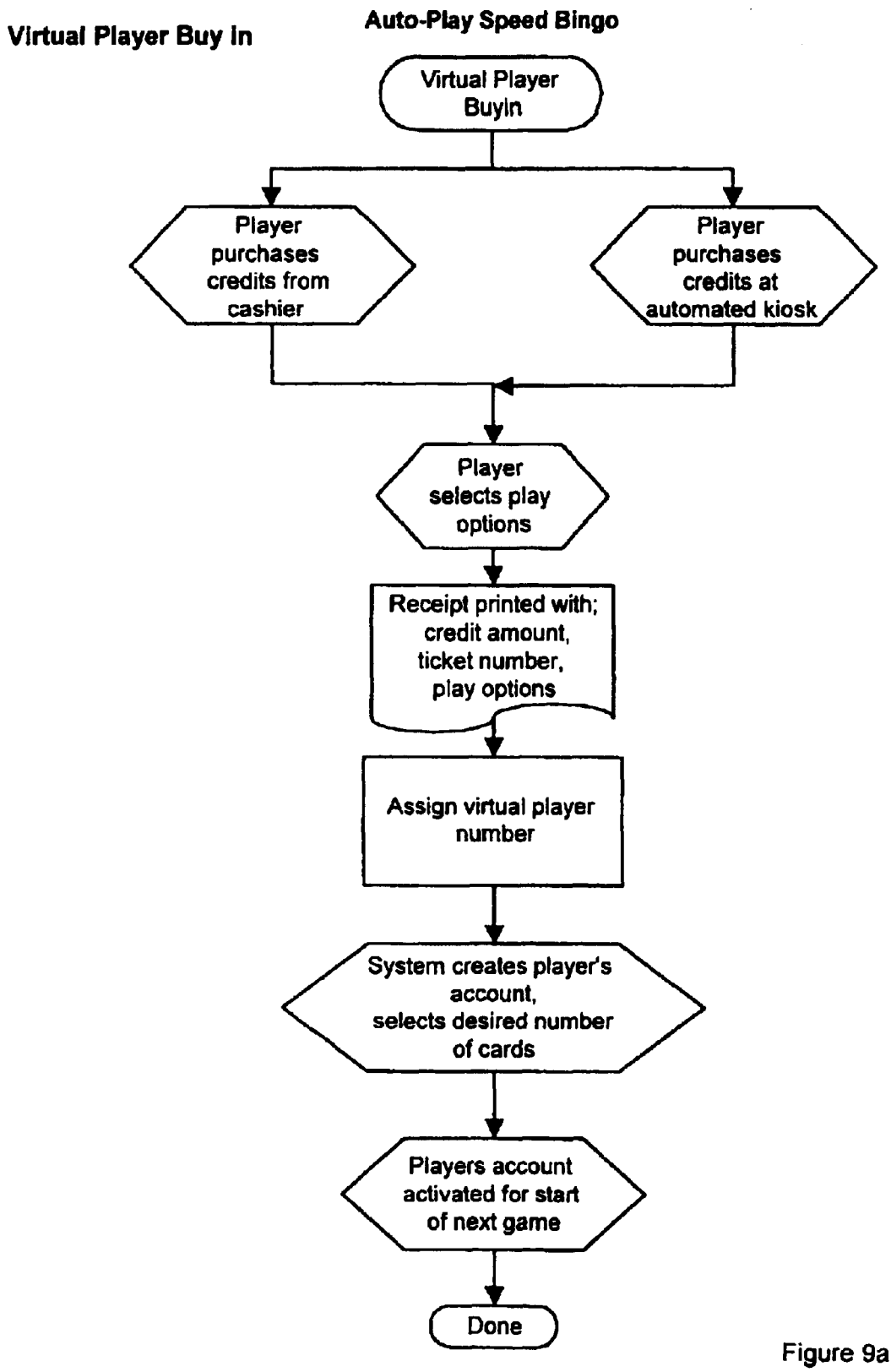
FIGS. 9a through 9e represent a flow chart illustrating participation in the game of FIG. 7 by "virtual" participants".
Figure 9B:
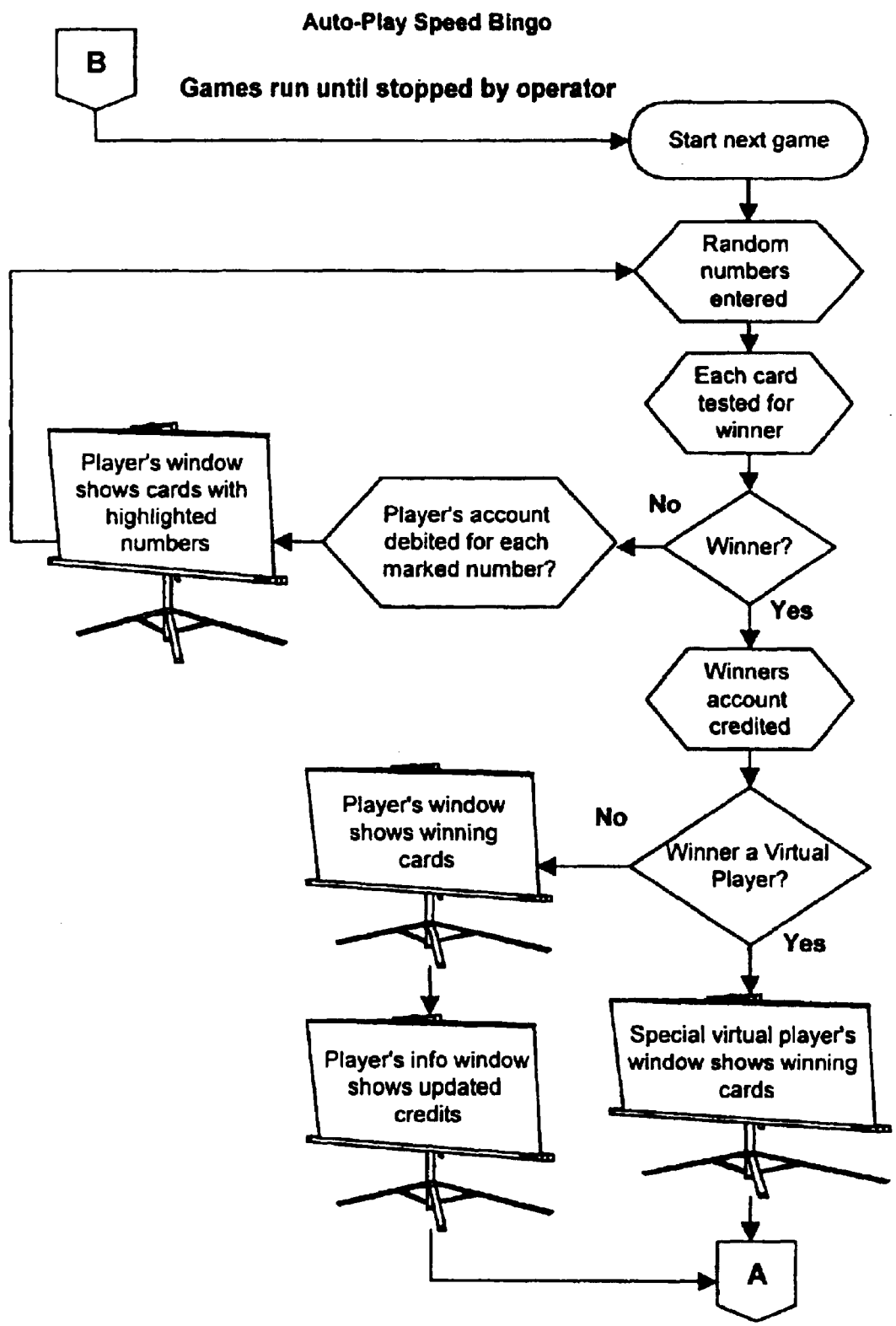
Figure 9C:
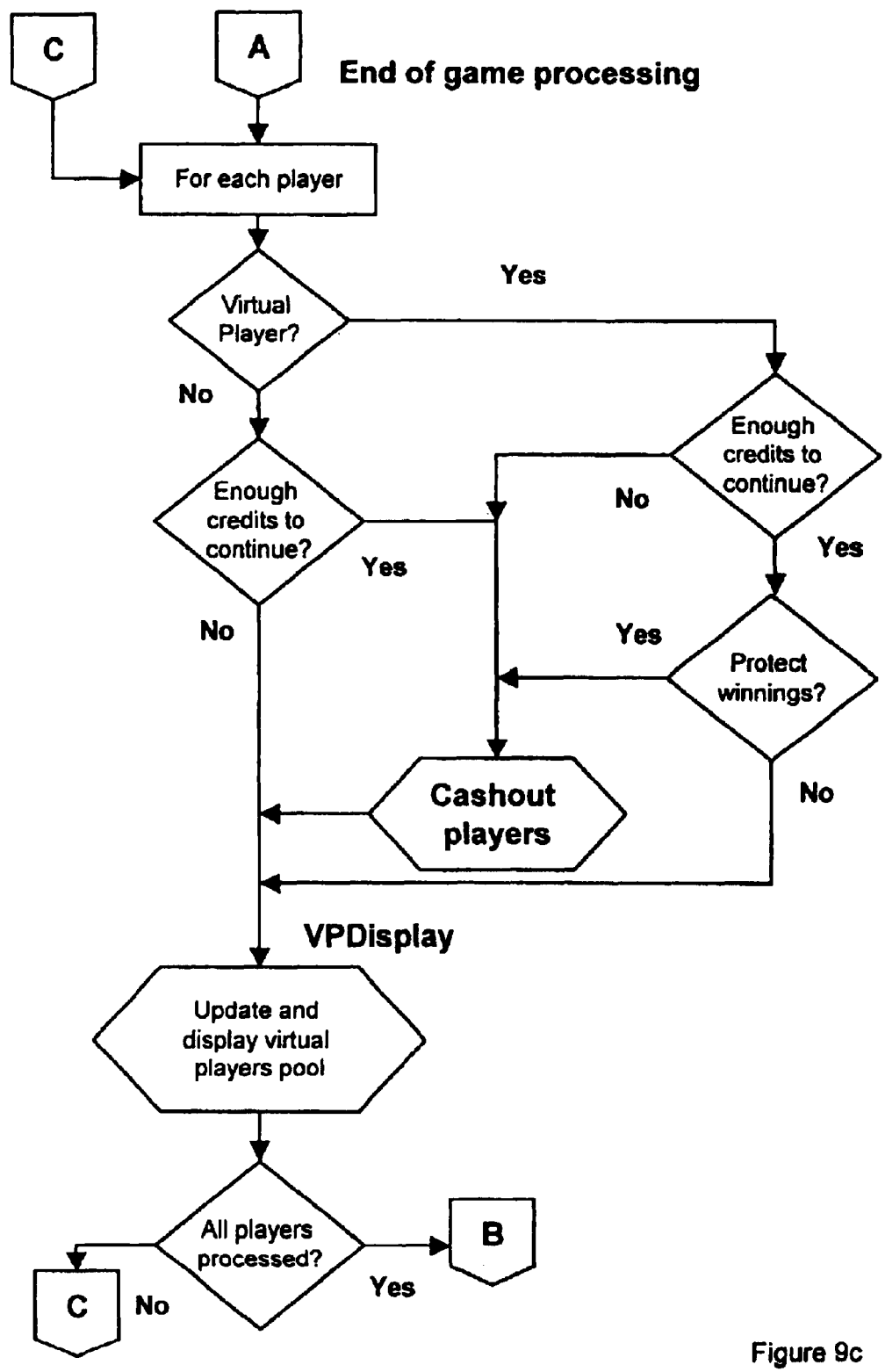
Figure 9D:
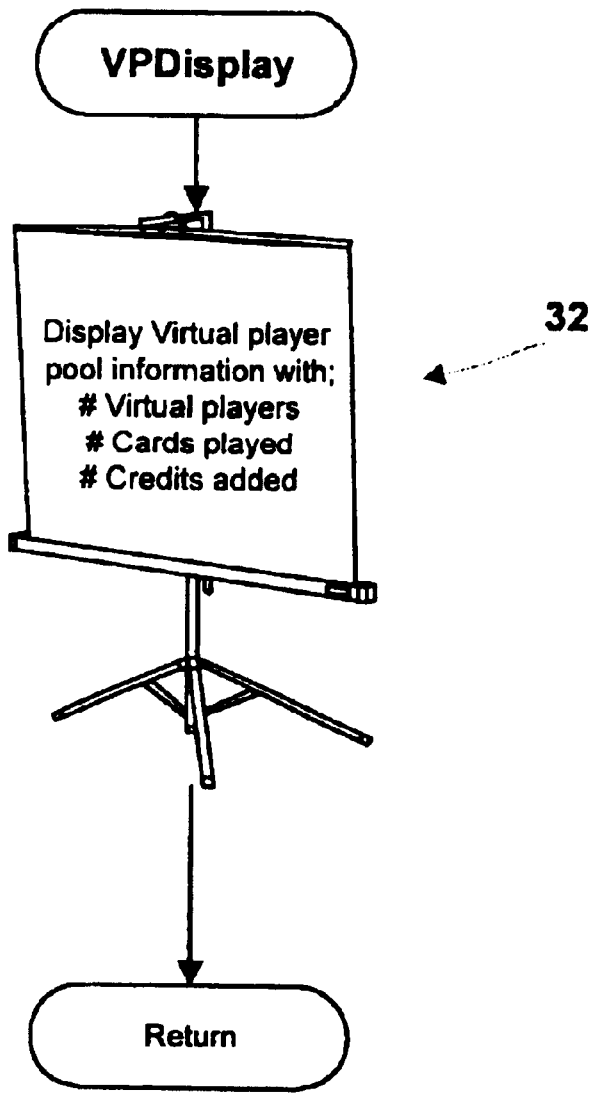
Figure 9E:
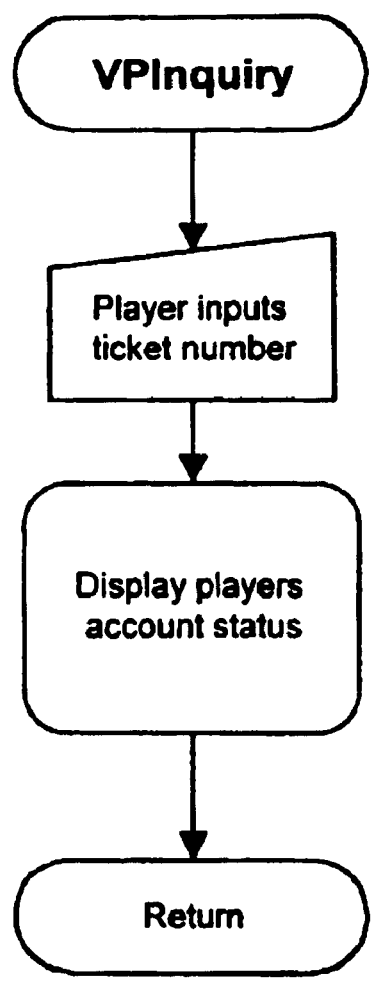

The computer-based game would then proceed as described previously herein, with numbers randomly selected until each game is concluded by one or more cards 16 achieving the winning pattern (FIG. 9b). Participant windows 12 on the common information display 10 are updated as the game proceeds. At any time during a game or subsequent thereto, a "virtual" participant may access the information display 10 at the game site or through the use of a remotely positioned display device to monitor his or her status and progress. In this regard, participant terminals may be located at convenient remote positions for access by "virtual" participants who, upon entering an appropriate identification code, could view a display summarizing his or her status inclusive of account debits and credits attributable to concluded game activity (FIG. 9e). When a winner is declared, the computer 24 identifies the winner (FIG. 9b) on the display 10, and then analyzes inputted information for each participant (both "active" and "virtual") to credit and debit participant accounts. Alternately, it will be appreciated that participant accounts may be credited or debited during the game as each number is called. As viewed in FIG. 9c, in accordance with participant accounts and other limiting parameters inputted by participants, the computer may proceed to cash out and terminate participation by some participants while permitting other participants to participate in the next game in succession.

The game display system and method of the present invention thus provides participants with important and highly relevant information regarding their real-time status in the game, as the game proceeds from beginning to end. The displayed information remains on display in equal detail throughout the entire period of play. The display communicates to all "active" participants their relative game status, or, in the case of a ranking display for large numbers of participants, the game status of a sizable group or subset of participants identified as real-time leaders in game score, so that individual participants can continuously update and assess their chances of winning. Moreover, by displaying this information throughout the game, followed by openly displaying and identifying the game winner or winners, participant confidence in the integrity of the game is enhanced. The game system and method is beneficially adapted for operation by a minimum personnel staff, thereby reducing operator costs.

While the invention has been shown and described in connection with a single large-size common information display 10 viewable simultaneously by all game participants at the game site, it will be recognized that variations on this display concept may be employed. For example, the display 10 may alternately or in addition be provided on individual display terminals viewable by the individual participants, or on shared display terminals adapted for viewing by a small number of participants located in the immediate vicinity thereof. Moreover, such additional display terminals for participant viewing can be positioned remote from the game site to accommodate, for example, remote participant participation via internet or other suitable remote connection to the main game computer 24. In each case, the display 10 contains information regarding the real-time game status of each participant by location or position, or a selected relatively large number of leading participants by participant ranking or score. For example, a remote participant could log-on to the game and participate via the internet, viewing his or her status relative to others by means of a remote-participant game status window 12. The position of the remote-participant game status window may change during the course of the game with changes in ranking of the remote participant or others.

The invention can be adapted for use in a range of different games of skill or chance and the like, particularly such as alternative bingo games using cards having numbers or the like arranged in different arrays, such as numbers arranged in a predetermined configuration of rows and columns. The invention may also be adapted for other types of games, such as slot machine tournaments wherein multiple participants enter for a fee ("ante") and compete for a high score which can be measured in terms of monetary winnings. The common information display 10 of the present invention would be configured to show the real-time status of each participant, or a group of top-ranked participants, as the tournament proceeds. As a result, individual participants could monitor their relative position in the field of participants, and develop game strategies aimed at improving their scores and associated chances of winning.

A variety of further modifications and improvements in and to the invention will be apparent to persons skilled in the art. Accordingly, no limitation on the invention is intended by way of the foregoing description and accompanying drawings, except as set forth in the appended claims.

What is claimed is:

1. In a computer-based game, a method of compiling and displaying participant game events and status information, said method comprising the steps of:

composing a common information display to include a plurality of participant windows for visually displaying game events and status information for a respective plurality of participants;

updating each of said participant windows in real-time as the game proceeds so that said participant windows show each event of each participant's game in real time, and current status information for each of said plurality of participants; and presenting said common information display to said plurality of participants throughout the course of the game, so that each participant can view all participant's games and monitor individual progress toward winning the game in relation to the progress of other participants;

wherein said composing step further comprises composing the common information display to include a summary status window including information regarding participation in the game by "virtual" participants, and further wherein said presenting step includes presenting the summary status window on the common information display.

2. In a computer-based game, a method of compiling and displaying participant game events and status information, said method comprising the steps of:

composing a common information display to include a plurality of participant windows for visually displaying game events and status information for a respective plurality of participants;

updating each of said participant windows in real-time as the game proceeds so that said participant windows show each event of each participant's game in real time, and current status information for each of said plurality of participants; and presenting said common information display to said plurality of participants throughout the course of the game, so that each participant can view all participant's games and monitor individual progress toward winning the game in relation to the progress of other participants;

wherein said updating step comprises ranking the participants according to each participant's real-time progress toward winning the game, and further wherein said presenting step comprises presenting the common information display in an array wherein windows for at least a selected number of leading participants are rearranged and displayed in order of participant ranking.

3. In a computer-based game, a system of compiling and displaying participant game events and status information, said system comprising:

computer means for composing a common information display to include a plurality of participant windows for visually displaying game events and status information for a respective plurality of participants;

said computer means including processor means for updating each of said participant windows in real-time as the game proceeds so that said participant windows show each event of each participant's game in real time and current status information for each of said plurality of participants; and display means for presenting said common information display to said plurality of participants throughout the course of the game, so that each participant can view each participant's game and monitor individual progress toward winning the game in relation to the progress of other participants;

wherein said processor means ranks the participants according to each participant's real-time progress toward winning the game; and wherein said display means presents the common information display in an array wherein windows for at least a selected number of leading participants are periodically rearranged to display the windows in order of participant ranking.

4. The system of claim 3 wherein said processor means includes means for identifying a winning participant at the conclusion of the game, and further wherein said display means includes means for visually indicating the winning participant at the conclusion of the game.

5. The system of claim 4 further including means for audibly indicating the winning participant at the conclusion of the game.

6. The system of claim 3 wherein said computer means further composes the common information display to include a game status window for visually displaying general game status information.

7. The system of claim 3 wherein said computer means includes means for composing the common information display to include a summary status window including information regarding participation in the game by "virtual" participants, and further wherein said display means includes the summary status window on the common information display.

8. The system of claim 3 wherein said display means presents said common information display for viewing by said participants at a game site.

9. The system of claim 8 further wherein the game site includes a plurality of participant seats arranged in a predetermined array, and further wherein said computer means includes means for arranging said participant windows of said common information display in accordance with said predetermined array of participant seats, so that each participant can identify the location and identity of other participants at the game site by viewing said common information display.

10. The system of claim 3 wherein said processor means includes means for arranging the participants by rank according to each participant's real-time progress toward winning the game, and further wherein said display means presents the common information display in an array to include status information for at least a selected number of leading participants displayed in order of participant ranking.

11. The system of claim 3 wherein said computer means determines the number and size of participant windows to be included on the common information display, and the information to be included within each of said participant windows.

12. The system of claim 3 further comprising participant terminal means for inputting to said computer means participant information regarding each participant's participation and stake in the game.

13. The system of claim 12 wherein said participant terminal means comprises a plurality of participant terminals.

14. The system of claim 13 wherein said processor means comprises a plurality of processor units associated individually with each of said participant terminals, and video memory means for coupling said processor units to said display means.

15. The system of claim 14 wherein said processor means further comprises a ranking processor coupled between said participant terminals and said video memory means for arranging the participants according to each participant's real-time progress toward winning the game, said video memory means being coupled to said display means whereby said display means presents the common information display in an array to include status information for at least a selected number of leading participants in order of ranking.

16. The system of claim 15 wherein said ranking processor is coupled between said participant terminals and said processor units.

17. The system of claim 15 wherein said ranking processor is coupled between said processor units and said video memory means.

18. A computer-based game system, comprising:
computer means including means responsive to inputted participant information to open accounts for a plurality of "active" participants and for a plurality of "virtual" participants;
a plurality of "active" participant terminals associated respectively with said plurality of "active" participants and each including means for inputting to said computer means participant information regarding the participation and stake in a game for each of said "active" participants; and
at least one "virtual" participant terminal including means for inputting to said computer means participant information regarding the participation and stake in the game for each of said plurality of "virtual" participants;
said computer means including means for initiating and controlling play of the game in steps and including at least one visual display for presenting current status information regarding the progress of the game;
said computer means further including means for identifying the a winning participant at the conclusion of the game and for visually indicating said winning participant on said at least one visual display at the conclusion of the game.

19. The system of claim 18 wherein said computer means includes means for composing and presenting said at least one visual display comprising a common information display presented to each of said "active" participants.

20. The system of claim 19 wherein said common information display includes status information for each of said "active" participants.

21. The system of claim 20 wherein said common information display includes summary status information for said plurality of "virtual" participants.

22. The system of claim 19 wherein said common information display includes a plurality of participant windows associated respectively with each of said "active" participant terminals.

23. The system of claim 19 further wherein a game site includes a plurality of "active" participant seats arranged in a predetermined array, and further wherein said computer means includes means for composing said common information display to include a plurality of "active" participant windows arranged in accordance with said predetermined array of "active" participant seats, so that each "active" participant can identify the location and identity of other "active" participants at the game site by viewing said common information display.

24. The system of claim 19 wherein said computer means includes means for composing said common information display to include a plurality of participant windows arranged by participant by rank according to each participant's real-time progress toward winning the game, and for presenting status information on said common information display for at least a selected number of leading participants in order of participant ranking.

25. The system of claim 18 wherein said computer means further includes means for audibly indicating said winning participant at the conclusion of the game.

26. The system of claim 18 wherein said computer means further composes the common information display to include a game status window for visually displaying general game status information.

27. The system of claim 18 wherein said at least one visual display is presented for viewing by all participants present at a game site.

28. The system of claim 18 wherein said computer means further includes means responsive to game outcome to debit and credit said participant accounts.

29. A computer-based game method, comprising the steps of:
   providing a plurality of "active" participant terminals associated respectively with a plurality of "active" participants;
   inputting participant information into a computer utilizing the "active" participant terminals to open participant accounts specifying participation and stake in a game for each of said "active" participants;
   providing at least one "virtual" participant terminal associated with a plurality of "virtual" participants;
   inputting participant information into the computer utilizing said at least one "virtual" participant terminal to open participant accounts specifying participation and stake in the game for each of said "virtual" participants;
   computer initiating and controlling play of the game in steps;
   computer generating at least one visual display including current status information regarding the progress of the game;
   updating said at least one visual display substantially in real-time as the game proceeds;
   identifying a winning participant at the conclusion of the game; and
   updating said at least one visual display to indicate said winning participant at the conclusion of the game.

30. The method of claim 29 further including the step of audibly indicating said winning participant at the conclusion of the game.

31. The method of claim 29 wherein said step of generating said at least one visual display comprises composing and presenting a common information display for viewing by each of said "active" participants.

32. The method of claim 31 wherein said common information display is presented for viewing at a game site.

33. The method of claim 31 wherein said steps of composing and presenting said common information display include providing a plurality of "active" participant windows associated respectively with each of said "active" participant terminals.

34. The method of claim 33 wherein said steps of composing and presenting said common information display include providing status information for a selected one of said plurality of "virtual" participants.

35. The method of claim 33 wherein said steps of composing and presenting said common information display include providing a summary status information for said plurality of "virtual" participants.

36. The method of claim 33 wherein said steps of composing and presenting said common information display further include providing a game status window for visually displaying general game status information.

37. The method of claim 33 further including the step of providing a plurality of "active" participant seats arranged in a predetermined array at a game site, and further wherein said steps of composing and presenting said common information display include arranging the "active" participant windows in accordance with the predetermined array of "active" participant seats, so that each "active" participant can identify the location and identity of other "active" participants at the game site by viewing said common information display.

38. The method of claim 33 wherein said steps of composing and presenting said common information display includes arranging the participant windows by participant rank according to each participant's real-time progress toward winning the game for at least a selected number of leading participants.

39. The method of claim 29 further including the step of debiting and crediting said participant accounts in accordance with game outcome.

40. A computer-based bingo game system, comprising:
   computer means for composing a common information display to include a plurality of participant windows for visually displaying one or more bingo cards and status information for each of a respective plurality of participants in a game;
   said computer means including means for initiating and controlling play of the bingo game in steps;
   said computer means including processor means for updating each of said participant windows in real-time as the game proceeds so that said participant windows include updated bingo cards and current status information for each of said plurality of participants;
   display means for presenting said common information display to said plurality of participants throughout the course of the game, so that each participant can monitor individual progress toward winning the game in relation to the progress of other participants; and
   said processor means including means for identifying a winning participant at the conclusion of the game.

41. The system of claim 40 wherein said display means further including means for visually indicating the winning participant at the conclusion of the game.

42. The system of claim 40 including participant terminal means for inputting to said computer means participant information regarding each participant's participation and stake in the game.

43. The system of claim 42 wherein said participant terminal means comprises a plurality of participant terminals.

44. The system of claim 43 wherein said processor means comprises a plurality of processor units associated individually with each of said participant terminals, and video memory means for coupling said processor units to said display means.

45. The system of claim 44 wherein said processor means further comprises a ranking processor coupled between said participant terminals and said video memory means for arranging the participant's windows according to each participant's real-time progress toward winning the game, said video memory means being coupled to said display means whereby said display means presents the common information display in an array to include status information for at least a selected number of leading participants in order of ranking.

46. The system of claim 45 wherein said ranking processor is coupled between said participant terminals and said processor units.

47. The system of claim 45 wherein said ranking processor is coupled between said processor units and said video memory means.

48. The system of claim 40 wherein said computer means further composes the common information display to include a game status window for visually displaying general game status information.

49. The system of claim 40 wherein said display means presents said common information display for viewing by said participants at a game site.

50. The system of claim 40 wherein said processor means includes means for arranging the participant's windows by rank according to each participant's real-time progress toward winning the game, and further wherein said display means presents the common information display in an array to include status information for at least a selected number of leading participants displayed in order of participant ranking.

51. The system of claim 40 wherein said computer means determines the number and size of participant windows to be included on the common information display, and the information to be included within each of said participant windows.

52. The system of claim 40 wherein said computer means is responsive to inputted participant information to open participant accounts, and further wherein said computer means is responsive to game outcome to debit and credit said participant accounts.

53. The system of claim 40 wherein said display means further includes means for audibly indicating the winning participant.

54. A computer-based bingo game method, comprising:
   inputting into a game computer participant information regarding each participant's participation and stake in the bingo game;
   composing a common information display to include a plurality of participant windows for visually displaying one or more bingo cards and status information for each of a respective plurality of participants in a game;
   utilizing the game computer to initiate and control play of the bingo game in steps;
   updating each of said participant windows in real-time as the bingo game proceeds so that said participant windows include updated bingo cards and current status information for each of said plurality of participants;
   presenting said common information display to said plurality of participants throughout the course of the bingo game, so that each participant can view each participant's bingo cards and monitor individual progress toward winning the game in relation to the progress of other participants; and
   said updating step further including the step of identifying a winning participant at the conclusion of the bingo game.

55. The method of claim 54, wherein said presenting step further including the step of visually indicating the winning participant at the conclusion of the bingo game.

56. The method of claim 54 wherein said composing step further includes the step of composing the common information display to include a bingo game status window for visually displaying general bingo game status information.

57. The method of claim 54 wherein said presenting step comprises presenting said common information display for viewing by said participants at a bingo game site.

58. The method of claim 54 wherein said updating step includes the step of arranging the participant's windows by rank according to each participant's real-time progress toward winning the bingo game, and further wherein said presenting step comprising presenting the common information display in an array to include status information for at least a selected number of leading participants displayed in order of participant ranking.

59. The method of claim 54 wherein said bingo game computer is responsive to inputted participant information to open participant accounts, and further wherein said bingo game computer is responsive to bingo game outcome to debit and credit said participant accounts.

60. The method of claim 54 wherein said presenting step further includes the step of audibly indicating the winning participant.

* * * * *